(12) United States Patent
Pajovic et al.

(10) Patent No.: US 10,498,558 B1
(45) Date of Patent: Dec. 3, 2019

(54) SYMBOL DETECTION IN SHARED WIRELESS CHANNEL

(71) Applicant: Mitsubishi Electric Research Laboratories, Inc., Cambridge, MA (US)

(72) Inventors: Milutin Pajovic, Cambridge, MA (US); Philip Orlik, Cambridge, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 15/977,024

(22) Filed: May 11, 2018

(51) Int. Cl.
*H04L 25/02* (2006.01)
*H04B 1/707* (2011.01)
(Continued)

(52) U.S. Cl.
CPC ......... *H04L 25/0256* (2013.01); *H04B 1/707* (2013.01); *H04L 25/03006* (2013.01); *H04W 74/0858* (2013.01)

(58) Field of Classification Search
CPC ......... H04L 25/0256; H04L 25/03006; H04W 74/0858; H04B 1/707
See application file for complete search history.

(56) References Cited

U.S. PATENT DOCUMENTS 6,240,099 B1 * 5/2001 Lim .................. H04B 1/7115
370/441

7,634,030 B2 * 12/2009 Kim .................. H04B 7/0413
375/140
(Continued)

FOREIGN PATENT DOCUMENTS

CN 101494625 A 1/2008
CN 102710568 B 5/2015
(Continued)

OTHER PUBLICATIONS

Tian et al/, "On Uplink Non Orthogonal Multiple Access for 5G: Opportunities and Challanges," China Communications, China Inst. Piscataway, NJ US. vol. 14, No. 12, Dec. 1, 2017. pp. 142-152.
(Continued)

*Primary Examiner* — Kenneth T Lam
(74) *Attorney, Agent, or Firm* — Gene Vinokur; James McAleenan; Hironori Tsukamoto

(57) ABSTRACT

A communication system includes a receiver to receive a signal with symbols encoded with a spreading code selected from a set of spreading codes, a filter to produce a filtered signal using a number of correlators less than a number of the spreading codes in the set of spreading codes, and a detector to detect the symbols transmitted by the transmitters from the filtered signal using sparse recovery with the dictionary matrix. The communication system also includes a processor to determine a minimum mean squared error (MMSE) matrix based on the set of spreading codes and a variance of noise in the channels, project the MMSE matrix to a low-dimensional space to produce a low-dimensional MMSE matrix, update the set of coefficients of set of correlators with the elements of the low-dimensional MMSE matrix, and update elements of a dictionary matrix based on the elements of the low-dimensional MMSE matrix.

16 Claims, 20 Drawing Sheets

(51) Int. Cl.
*H04L 25/03* (2006.01)
*H04W 74/08* (2009.01)

(56) References Cited

U.S. PATENT DOCUMENTS

| | | | | |
|---|---|---|---|---|
| 8,218,697 | B2* | 7/2012 | Guess | H04L 1/0048 375/144 |
| 2003/0218998 | A1* | 11/2003 | Kim | H04B 1/7105 370/335 |
| 2008/0232327 | A1* | 9/2008 | Kuroyanagi | H04B 1/71055 370/335 |
| 2011/0206031 | A1* | 8/2011 | Yoshimoto | H04B 1/59 370/345 |

FOREIGN PATENT DOCUMENTS

| | | |
|---|---|---|
| CN | 107026805 A | 1/2016 |
| EP | 1128564 A1 | 8/2001 |
| GB | 2418327 A | 3/2006 |
| WO | 2017065355 A1 | 1/2016 |
| WO | 2016177815 A1 | 5/2016 |
| WO | 2017057834 A1 | 7/2016 |

OTHER PUBLICATIONS

Xie et al., "Reduced-Dimension Multiuser Detection." IEEE Transactions on Information Theory ( vol. 59 , Issue: 6 , Jun. 2013 ). IEEE Information Theory Society. pp. 3858-3874.

Guo et al., "Multiuser Detection of Sparsely Spread CDMA." IEEE Journal on Selected Areas in Communications ( vol. 26 , Issue: 3 , Apr. 2008 ). pp. 421-431.

Li et al., "Design of reduced-rank MMSE multiuser detectors using random matrix methods." IEEE Transactions on Information Theory ( vol. 50 , Issue: 6 , Jun. 2004 ). pp. 986-1008.

* cited by examiner

SYMBOL DETECTION IN SHARED WIRELESS CHANNEL

TECHNICAL FIELD

The present disclosure relates to communications systems and more particularly to packet collision detection for decoding symbols transmitted over shared wireless channel in multi-user communication systems.

BACKGROUND

In general, multiuser detection deals with demodulation of the mutually interfering digital streams of information that occur in areas such as wireless communications, high-speed data transmission, DSL, satellite communication, digital television, and magnetic recording. The multiuser detection is also being currently investigated for demodulation in low-power inter-chip and intra-chip communication.

Multiuser detection encompasses technologies devoted to joint detection of interfering signals received over a shared channel Mutual interference is unavoidable in modern spectrally efficient wireless systems: even when using orthogonal multiplexing systems such as TDMA, synchronous CDMA or OFDMA, multiuser interference originates from channel distortion and from out-of-cell interference. In addition, in multi-antenna (MIMO) systems, the digitally modulated streams emanating from different antennas interfere at the receiver, and the MIMO receiver uses multiuser detection techniques to separate them. By exploiting the structure of the interfering signals, multiuser detection can increase spectral efficiency, receiver sensitivity, and the number of users the system can sustain.

For example, consider a communication system where users (transmitters) are in communication with a single receiver, such as a base station and/or an access point. The users transmit in the same frequency band and potentially in the same time slot, and are equipped with spreading codes so that the receiver can separate their transmissions (i.e., detect symbols they transmit). The separation is done by means of filter bank in the receiver's front end. The filter bank include correlators, each correlator correlates the received signal with a certain code, specific to such a correlator. In a conventional multi-user detection system, the number of correlators in the filter bank is equal to the number of spreading codes used by transmitters, so that each correlator is associated with one transmitter. In addition, the spreading codes in the conventional system are designed to be orthogonal or close to be orthogonal.

However, the number of orthogonal spreading codes is limited, and can be insufficient for a multiuser communication system, such as IoT systems with hundreds or even thousands of users/transmitters. Such a deficiency leads to the usage of non-orthogonal codes, which in turn leads to packet collisions and to challenging packet recovery problems, see, e.g., U.S Publication 2017-0244815.

SUMMARY

In a growing number of IoT applications, the number of transmitting devices prevents assignment of only orthogonal channel resources. Consequently, symbols transmitted from active users collide, which necessitates their separation on the receiver side. Given that an IoT user (transmitter) transmits with low probability, the sparsity in the user activity domain can been exploited to formulate the symbol separation problem as a sparse recovery problem. However, an excessive computational complexity remains a challenge, where the number of filters used by the receiver is equal to the overall number of users. Consequently, there is a need for reduced-dimension processors facilitating low complexity symbol separation.

It is an object of some embodiments to provide a multiuser communication system suitable for handling a scenario where a large number of transmitting users, such as internet of things (IoT) devices, are in communication with a receiver. The number of users can be large, such as hundreds or even thousands. Some embodiments are based on recognition that a multi-user detection system configured to handle such a requirement can face several issues. First, implementing an exceedingly large number of correlators (hundreds, if not thousands) in the receiver, leads to an increase of a computational complexity and energy consumption in the receiver. Second, the spreading codes assigned to a large number of users are not orthogonal. Additionally or alternatively, acquiring channel state information from all users on the receiver side can be impractical for some applications.

Some embodiments are based on recognition that a large number of transmitters lead to non-orthogonal spreading codes, while out of that large number of transmitters, only few of the transmitters transmit at the same time, i.e., within the same time slot. For example, an IoT device may not have information for transmission all the time. For example, an IoT device may only occasionally send temperature measurements.

Some embodiments are based on recognition that sparse transmission of non-orthogonal codes still necessitates recovery of transmitted symbols. Some embodiments are based on realization that such a recovery, e.g., a sparse recovery of collided symbols, can be used not only to detect the symbols, but also to reduce a number of correlators at the front end used to filter the received signal encoded with the spreading codes. In such a manner, some embodiments reduce the number of required correlators in the filter bank, without reducing the number of users. Or, equivalently—given the number of correlators, some embodiments increase the number of users the receiver can support, beyond the number of correlators of the receiver.

Overall, some embodiments are based on realization that because only few users transmit at the same time, the received signal is low dimensional, i.e., "lives" in a low-dimensional subspace of the space spanned (i.e., generated) by the spreading codes. Consequently, by projecting the received signal onto axes of such subspace, the transmitted symbols can be separated from the obtained projections. As defined herein, the low-dimensional subspace is a signal space having less dimensions than the dimensions of the signal space defined by the set of available spreading codes.

For example, let say that out of 100 potentially transmitting users, only three users have transmitted within a given time slot. Let say that identity of those three users (and their spreading codes) are known. In that case, the received signal is a mix of three spreading codes associated with those users. Such a signal is low dimensional in the space spanned by the spreading codes, in particular, the received symbol "lives" in low-dimensional subspace, the dimension of which is three (provided that spreading codes are independent, which is always satisfied). The filter bank would in that case include three correlators, each one tuned to one spreading code. The filtered signal include three values, referred to as filtered symbols. Those three values are effectively "coordinates" of the received signal in the low dimensional subspace where the received signal "lives." The detection of symbols transmitted by the three active users is subsequently done from those three "coordinates".

Now, imagine another example when three users have transmitted within a given time slot, but their identities are unknown. Then, the received signal is a mix of three spreading codes. Those spreading codes are unknown but belong to a set of spreading codes. The received signal still "lives" in a low-dimensional subspace, the dimension of which three. However, the basis (i.e., the "identity") of that subspace is unknown. Thus, the filter bank essentially performs projections of the received signal onto pseudo-random basis. Implementation-wise, the correlators' coefficients are designed so that the output values (filtered symbols) contain fingerprints of any spreading code that might be present in the received signal. In this example, the number of correlators in the filter bank has to be at least three, but usually more (such as five) so as to achieve acceptable detection performance, and the pseudo-random basis or fingerprints of the transmitted spreading codes are recovered with sparse recovery techniques.

In general, embodiments do not know in advance how many users may transmit within a time slot. However, based on statistics of how often a particular device may transmit, some embodiments estimate an upper bound of that number. The number of correlators in the filter bank has to be at least equal to the number of users transmitting at the same time, and is larger in some implementations to yield better detection performance. The number of correlators defines the dimensionality of the low-dimensional space, while the number of available spreading codes define the dimensionality of the high-dimensional space.

Some embodiments are based on realization that there is a relationship between the coefficients of the correlators of the filter at the front end and dictionary matrix used by the sparsity detector. Specifically, this dependency allows to reduce the dimensionality of the filter while still allowing to recover the transmitted symbols. Some embodiments establish such a dependency through a minimum mean squared error (MMSE) matrix: the coefficients of the filter and the coefficients of the dictionary matrix are functions (although different functions) of the same MMSE matrix.

For example, the correlators' coefficients form a matrix, which some embodiments compute based on the MMSE matrix and some dimensionality-reduction matrix. If the number of correlators in the filter bank is equal to the number of users, there is no dimensionality reduction and the matrix of the correlators' coefficients is equal to the MMSE matrix. The MMSE matrix is computed from the spreading codes of all users and noise variance. The coefficients in the MMSE matrix form the MMSE filter. The MMSE filer is the optimum linear processor that minimizes the power in the error signal, defined as the difference between the truly transmitted signal from a user and the signal at the output of the filter bank's correlator associated with that user.

Some embodiments project the MMSE matrix to a low-dimensional space to produce a low-dimensional MMSE matrix that forms the coefficients of correlators of the filter. In addition, the coefficients of the dictionary matrix are also function of the low-dimensional MMSE matrix.

In some embodiments, the dimensionality-reduction matrix is selected from some set of matrices. The purpose of the dimensionality-reduction matrix is to project the signal that would be output from the MMSE filter into some lower-dimensional space. Note that the MMSE filter is not directly implemented and thus does not directly act on the received signal in some embodiments (otherwise, there would not be reduction in the number of correlators from the conventional multi-user detection scheme). Instead, the filter bank (i.e., the matrix of its coefficients) of some embodiments is computed from the MMSE matrix and the dimensionality-reduction matrix. The detection of active users and their symbols is performed from the filtered signal.

Different embodiments select dimensionality-reduction matrix in a different manner. Some embodiments project the received signal into subspace spanned by the pseudo-random axes (each projection is implemented with one correlator in the filter bank and the each axis is specified by the coefficients of that correlator). Since the active users are unknown, some embodiments aim to do such projections so that each spreading code gets its fingerprint in the filtered signal. However, that is doable in a number of ways.

For example, one embodiment is based on recognition that the obtained projections should be as distinct as possible so that the information contained in the filtered signal renders detection of transmitted symbols (and the spreading codes present in the received signal). Mathematically, this is an analogous of a requirement that the pseudo-random basis vectors be as orthogonal as possible. In other words, the pseudo-random basis vectors need be as distinct as possible. This requirement is captured by the coherence of the matrix of correlators' coefficients. The coherence of a matrix is defined as the largest cross-correlation between any two distinct columns of the matrix. Thus, some embodiments select the dimensionality-reduction matrix from the set of candidates so that the coherence of the resulting matrix of the correlators' coefficients is minimized.

Accordingly, one embodiment discloses a communication system including a receiver including an antenna to receive a signal including one or combination of symbols transmitted by multiple transmitters over wireless channels connecting the transmitters with the communication system, wherein the signal is encoded, such that each symbol is encoded with a spreading code selected from a set of spreading codes, and wherein the duration of the received signal is at least the duration of the spreading code; a filter to produce a filtered signal, wherein the filter includes a set of correlators to produce a set of filtered symbols and a combiner to combine the filtered symbols to produce the filtered signal, wherein each correlator includes coefficients to process the received signal and produce a filtered symbol, wherein a number of correlators in the set of correlators is less than a number of the spreading codes in the set of spreading codes; a detector to detect the symbols transmitted by the transmitters from the filtered signal using sparse recovery with a dictionary matrix; and a processor to determine a minimum mean squared error (MMSE) matrix based on the set of spreading codes and the variance of noise in the channels; project the MMSE matrix to a low-dimensional space to produce a low-dimensional MMSE matrix; update the set of coefficients of set of correlators with the elements of the low-dimensional MMSE matrix; and update elements of the dictionary matrix based on the elements of the low-dimensional MMSE matrix.

DETAILED DESCRIPTION

Figure 1A:
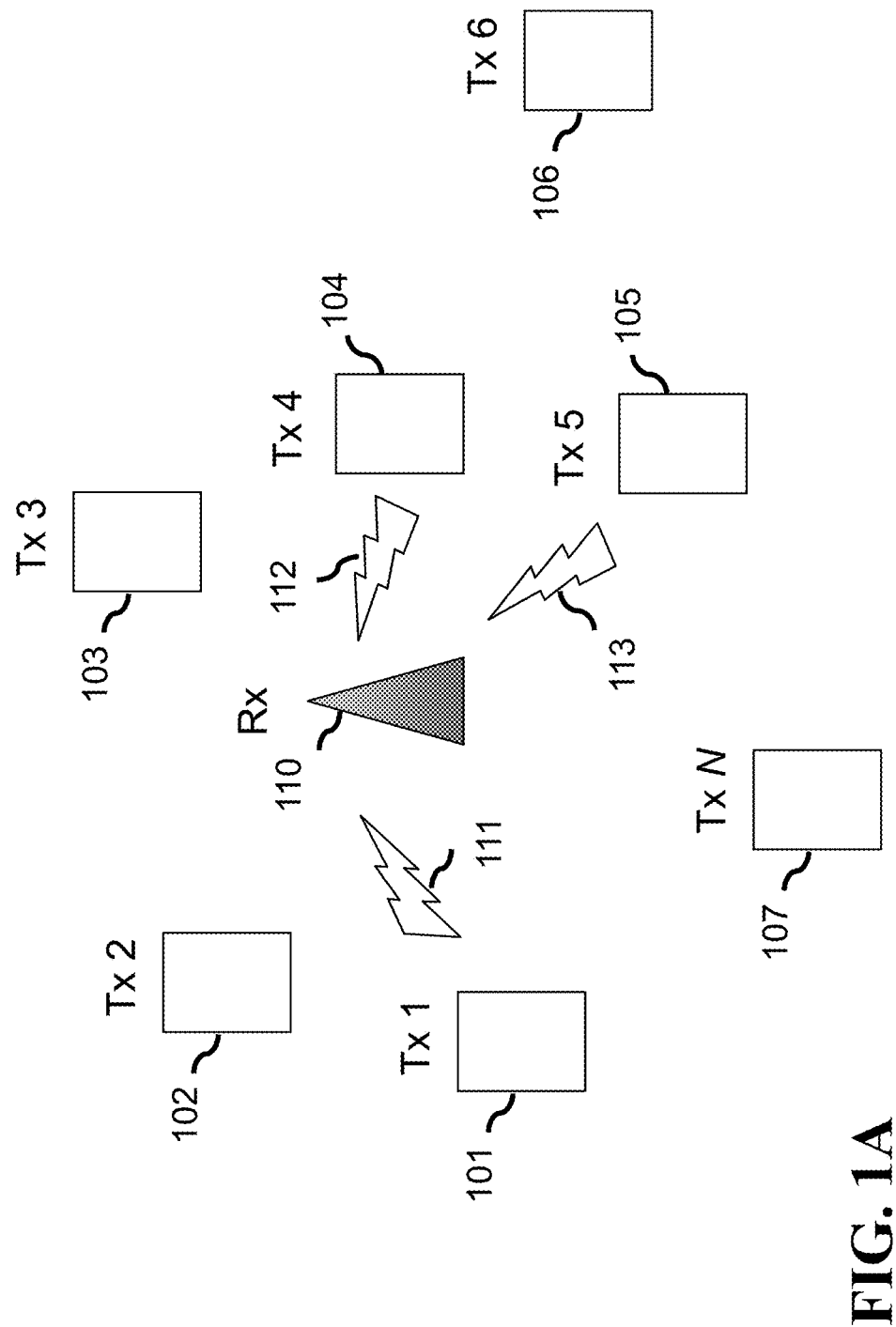
FIG. 1A shows a schematic of a communication system according to some embodiments.

FIG. 1A shows a schematic of a communication system according to some embodiments. For example, the communication system includes multiple transmitters 101, 102, 103, 104, 105, 106 and 107, also referred herein as "users," are in uplink communication with a common receiver 110. The active users 101, 104 and 105 happen to transmit signals 111, 112 and 113 over the shared channel so that the signals collide. The receiver 110 employs signal processing methods on the received signal with the goal to separate signals of active users. The users can be internet of things (IoT) devices, while the receiver can be an access point (AP), in case of an indoor setting, or a base station (BS) in case of an outdoor setting.

The communication system of various embodiments can consider a large number, such as hundreds or thousands, of transmitters that send information to a common receiver. Typically, the users are synchronized in time. That means that the time axis is divided into time slots, where each user knows the beginning and ending time instant of each time slot.

Figure 1B:
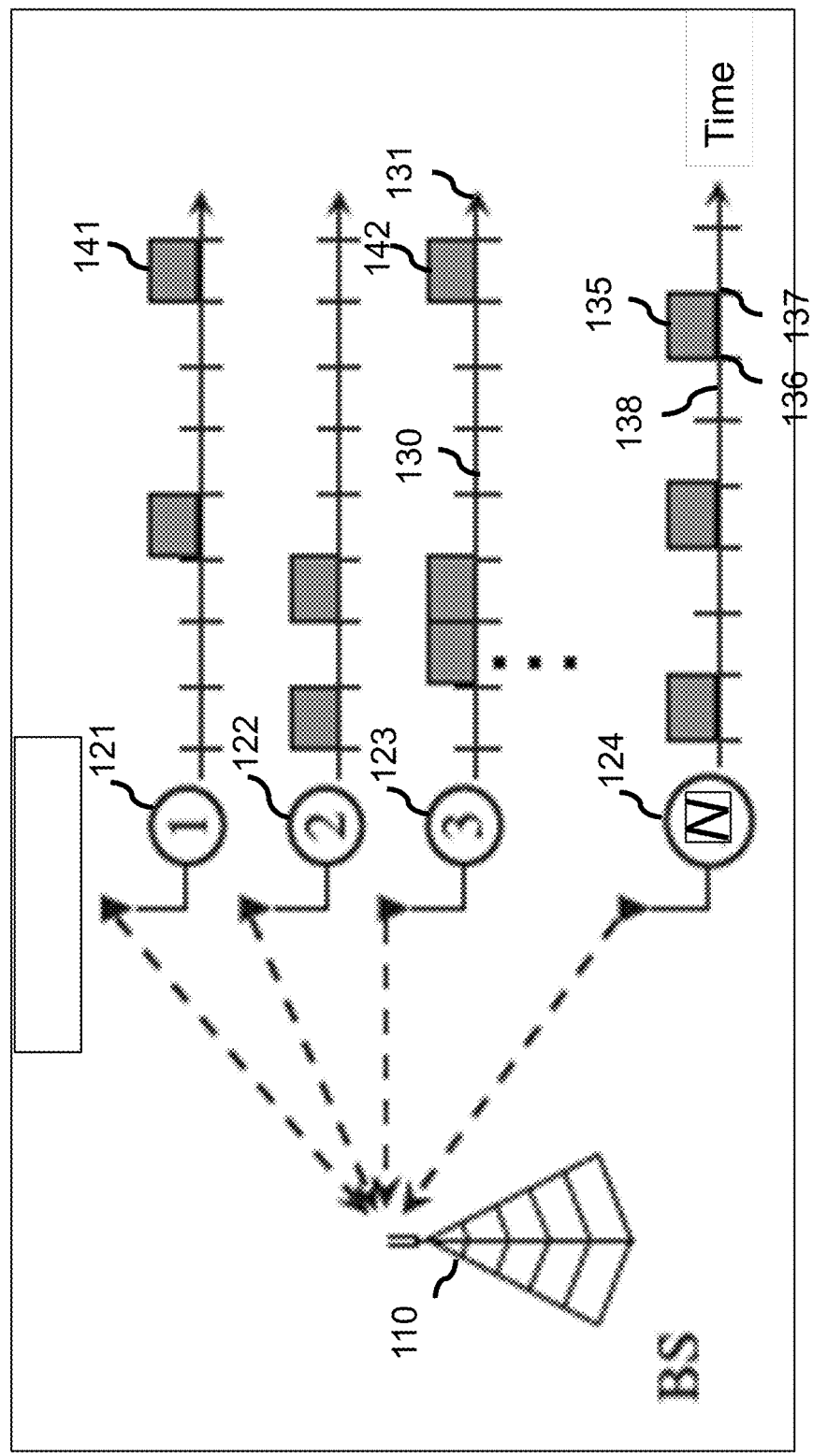
FIG. 1B shows a schematic of exemplar synchronized uplink transmission where users only occasionally transmit data according to some embodiments.

FIG. 1B shows a schematic of exemplar synchronized uplink transmission where users only occasionally transmit data according to some embodiments. In this example, N users 121, 122, 123 and 124 are in communication with the receiver 110. The time axis 131 is divided into time slots 130 such that data transmission 135 happens within a time slot that begins at 136 and ends at 137. In this embodiment, if a transmitter gets data to send at an instant 138, it needs to wait until the beginning of the following time slot 136 to start sending the data.

However, out of a large number of users, only few of them happen to transmit at the same time. For example, this scenario arises in IoT networks where a large number of IoT devices can communicate with the same access point, but only few of them transmit signals at the same time. For example, an IoT device may be a temperature sensor which sends its measurements once in an hour. As illustrated in FIG. 1B, only two users 121 and 123 send data 141 and 142 during the same time slot, while all other N–2 users are silent/inactive within that time slot.

Some embodiments are based on recognition that when the user of communication system are assigned orthogonal channel resources, their transmissions do not collide. That means that if two users transmit at the same time, they do so in different frequency bands so that their signals are separated in the frequency domain. However, if users are assigned the same frequency band and allowed to transmit at the same time, they may be assigned orthogonal spreading codes so that their transmissions can be separated in the spreading code domain. Furthermore, even if two or more users share the same channel, meaning that they may transmit at the same time in the same frequency band and have non-orthogonal spreading codes, a number of channel access control mechanisms have been developed to ensure that only one user utilizes the channel resources at a given time. Overall, there are many techniques developed in communications over many decades whose goal is to reduce the likelihood and detrimental effects of collisions between transmissions of two or more users.

However, an extension of these communication technologies to a setup where a large number of users are in communication with the same access point, poses significant challenges. First, the number of users may prevent assigning them orthogonal channel resources. For example, a given frequency band may not be wide enough that each user gets one chunk of it, such that any two different chunks do not overlap. Second, because users only occasionally transmit signals, assigning orthogonal channel resources to them would lead to channel underutilization. For example, even in the case where available bandwidth is wide enough so that each user gets one independent chunk of it, a large portion of the frequency band would not be used most of the time. Third, employing network management and control techniques, developed to ensure that one user utilizes channel resources at a given time, can be impractical. Namely, given a large number of users of which only small portion of them has data to send at a given time slot, the network control and management would result in a prohibitively large overhead. Consequently, that can lead to channel underutilization because the channel resources would be used predominantly for control and management and much less for data transmission.

To that end, some embodiments consider an communication application where (1) a large number of users synchronously send data to the same access point, (2) only a small portion of users have data to transmit at a given time slot, so that (3) employment of conventional communication techniques designed to avoid collisions between different transmissions is impossible or impractical.

In such a manner, each user in the communication application considered by some embodiments is assigned a unique spreading code. The spreading codes are, however, not necessarily orthogonal. This is because, as discusses above, the number of users is usually so large that there are not so many orthogonal codes. Essentially, each user encodes its data using its own spreading code. For example, a spreading code is, in general, a waveform w whose duration is equal to the signaling interval, also called symbol time, such that in the case of BPSK modulation, a user represents the symbol +1 with w and the symbol −1 with −w. Note that when some user does not encode its data is equivalent to having w=1.

Figure 1C:
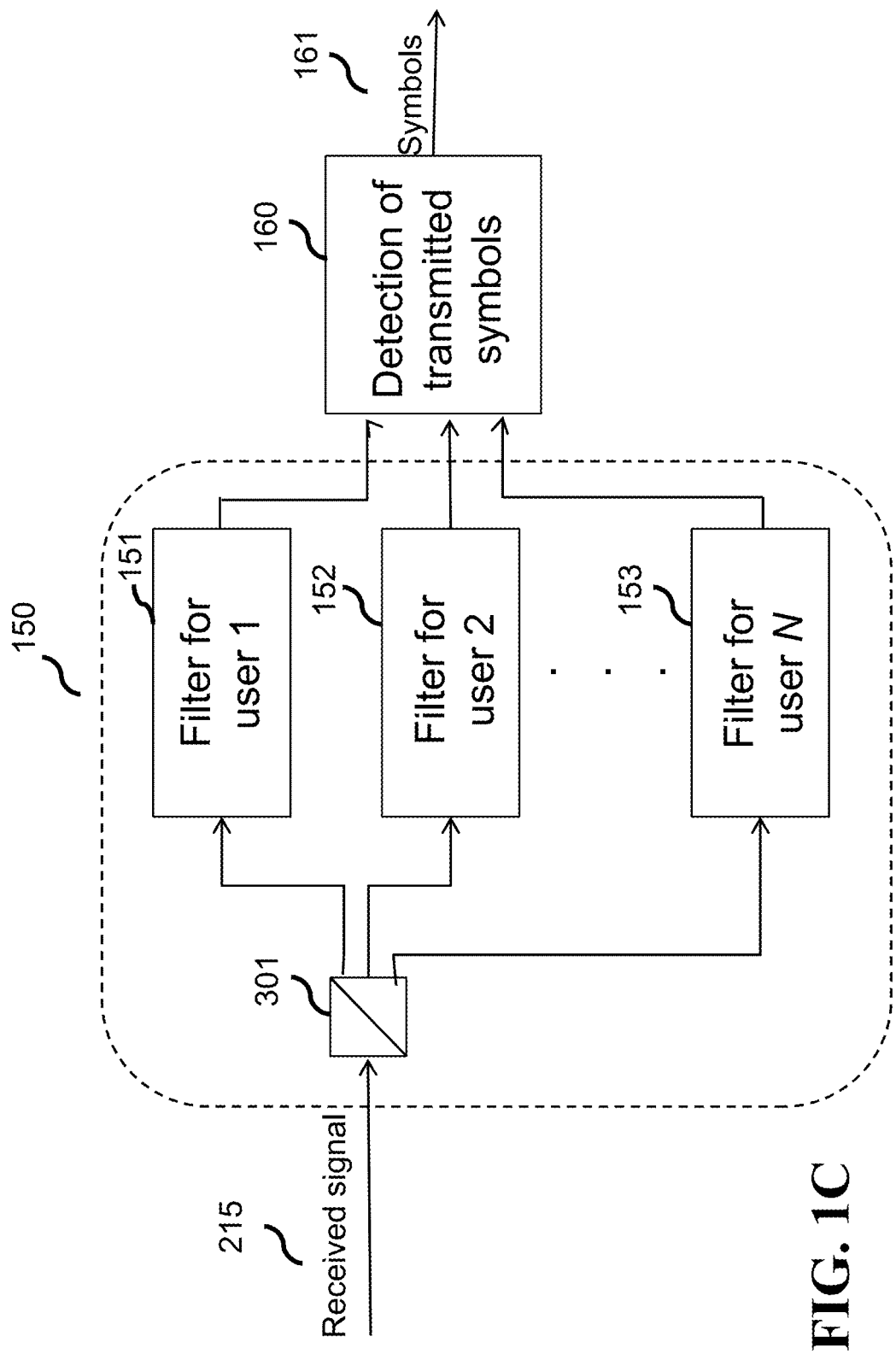
FIG. 1C shows a block diagram of a multi-user detection (MUD) filter bank transformed by some embodiments.

FIG. 1C shows a block diagram of a multi-user detection (MUD) filter bank transformed by some embodiments. The MUD processes the received signal 215, after pre-processing steps, through a matched filter bank (MFB) 150. The received signal goes through a splitter 301, whose each output is fed into input of one filter in the MFB. The template of each matched filter 151, 152 and 153 is spreading code of the corresponding user. Overall, the MFB contains N filters, one for each user. The outputs from the MFB include sufficient statistics for the detection 160 of transmitted symbols in the considered signaling interval. The detector outputs detected symbols 161.

However, a challenge of the MUD of FIG. 1C is that the required number of filters implemented in the filter bank is equal to the number of users, which may be hundreds or thousands. In addition, this leads to a long MFB output signal that needs to be stored, resulting in a relatively large memory storage requirement. Finally, since the transmitted symbols are recovered from the MFB output signal, this also results in relatively large computational complexity requirement.

To that end, it is an object of some embodiments to transform the MUD of FIG. 1C to design a filter bank so as to reduce all or subset of the following: (1) the number of required filters in the filter bank, (2) memory storage requirement and (3) computational complexity in the detection stage.

Some embodiments are based on recognition that the sparsity in the user activity domain can be exploited by reducing the number of filters in the MFB at the expense of possible performance deterioration. Thus, an aim is to design a reduced dimension processor consisting of M filters with templates $f_m$, m=1, . . . , M, where M<N and preferably, M=N.

Figure 2:
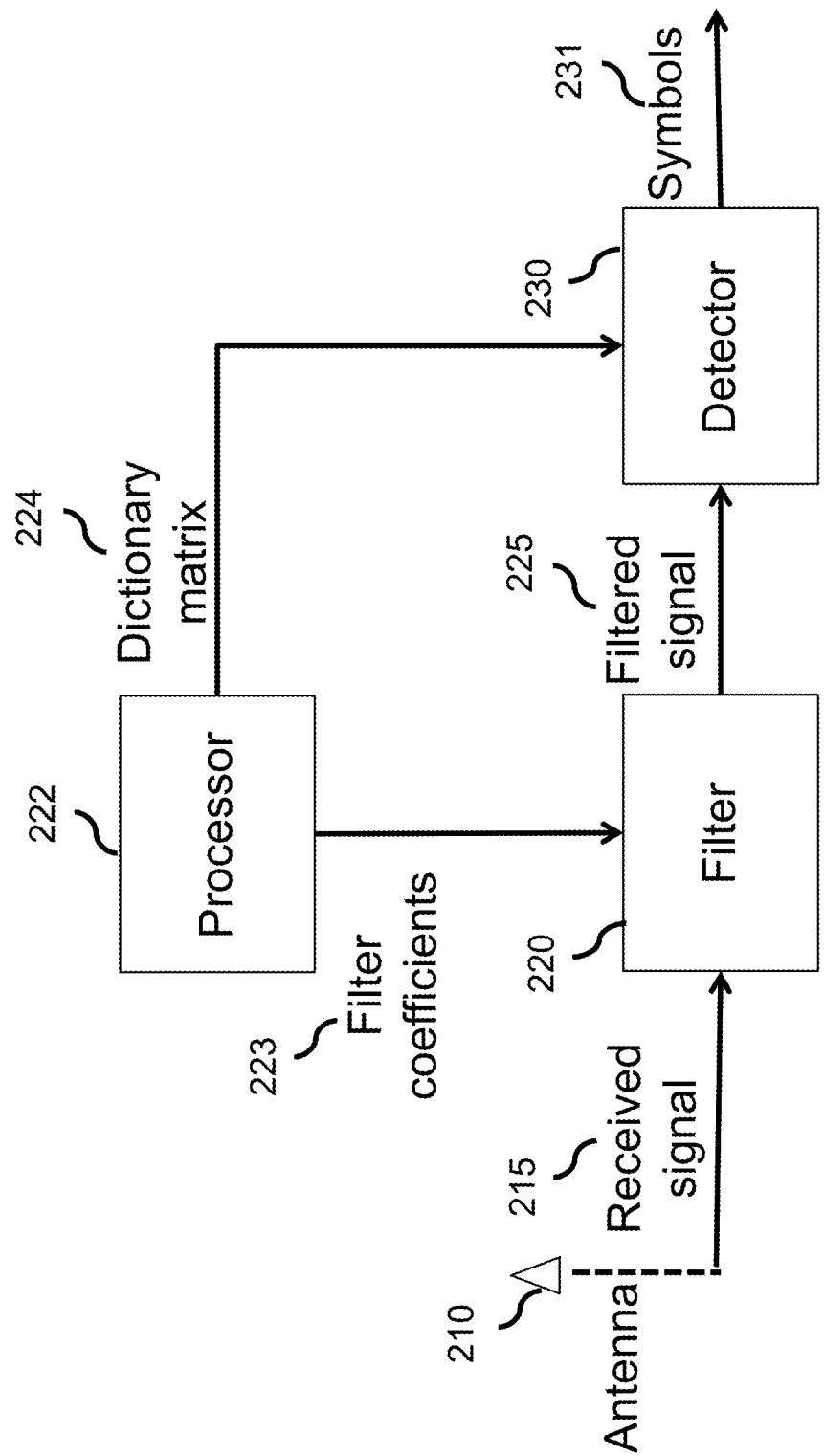
FIG. 2 shows a block diagram of the a receiver designed according to principles employed by various embodiments.

FIG. 2 shows a block diagram of the a receiver designed according to principles employed by various embodiments. The receiver includes an antenna 210 which receives the signal from transmitters of one or multiple active users. No restriction is placed on the type of the employed antenna. The duration of the received signal is at least equal to the duration of the spreading code. In other words, the received signal is not processed until the waveform corresponding to one whole signaling interval is received. The received signal 215 goes through filter 220, whose coefficients 223 are computed in processor 222. The filtered signal 225 is then input to detector 230 that detects transmitted symbols 231 using sparse recovery method with dictionary matrix 224 obtained from the processor 222.

Figure 3:
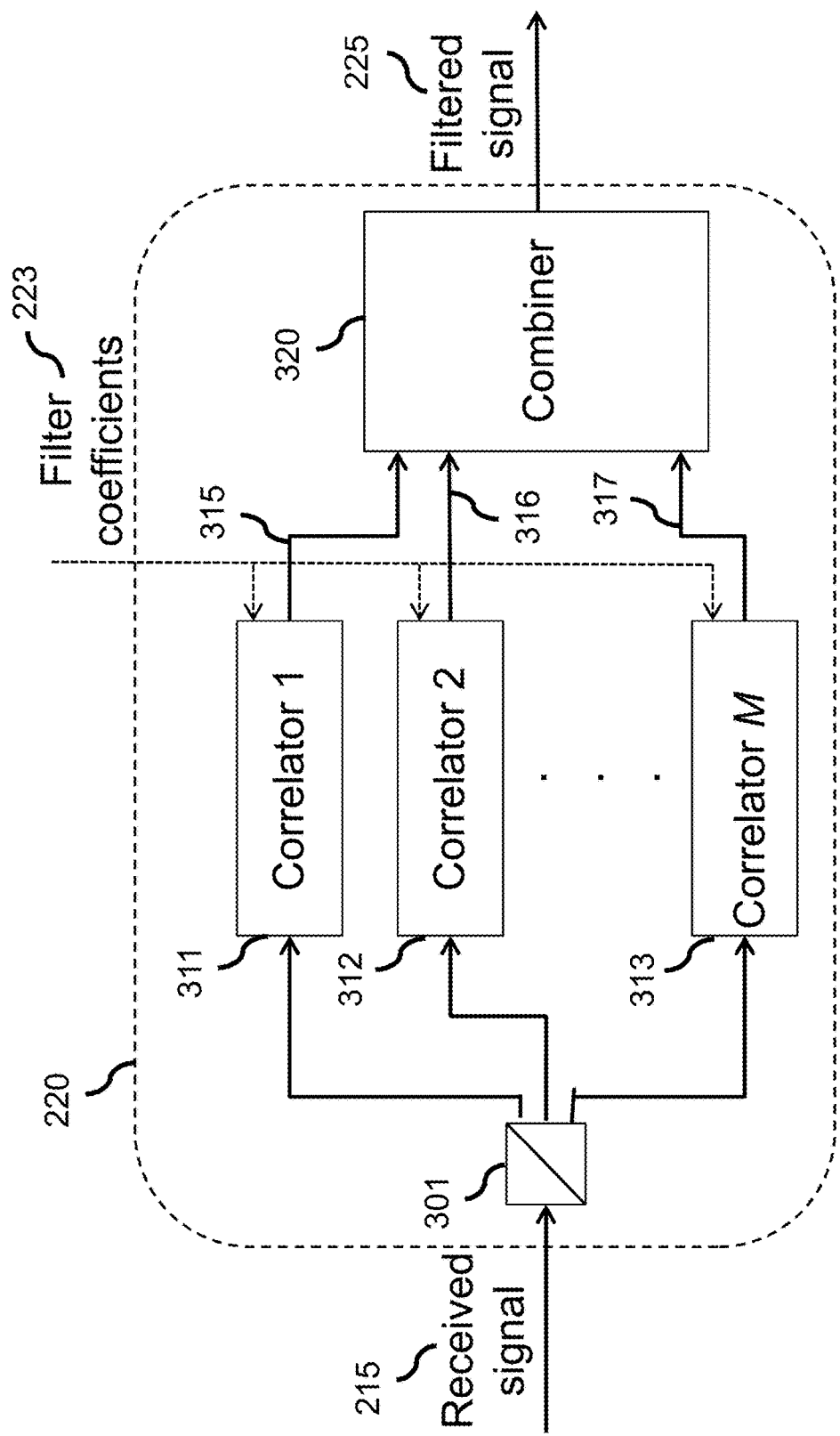
FIG. 3 shows a block diagram of a reduced dimension filter according to one embodiments.

FIG. 3 shows a block diagram of a reduced dimension filter 220 according to one embodiments. The received signal 215, after passing through the splitter 301, is processed in the filter 220 including M correlators 311, 312 and 313. The set of correlators' coefficients forms the filter coefficients 223. The output of each correlator is filtered symbol 315, 316 and 317. The filtered symbols enter a combiner 320 for combining. For example, the combiner 320 essentially filter symbols into a vector and outputs the filtered signal 225.

Figure 4A:
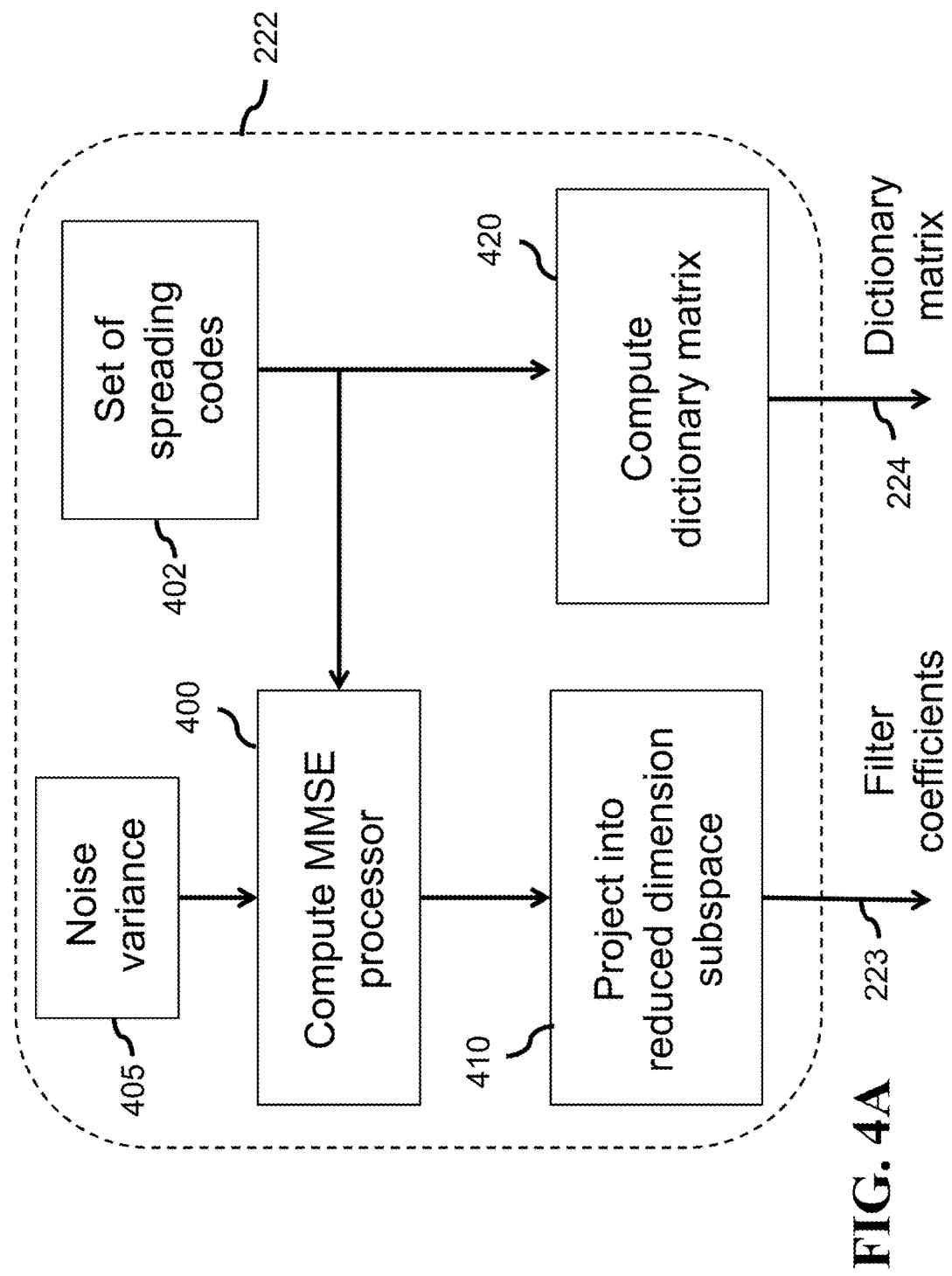
FIG. 4A shows a block diagram of the operation of a processor configured according to some embodiments.

FIG. 4A shows a block diagram of the operation of a processor 222 configured according to some embodiments. One building block of the processor evaluates the minimum mean square error (MMSE) matrix 400 using the set of spreading codes assigned to the users 402 and noise variance 405. The noise variance is either given/known in advance or estimated from data using a noise variance estimation. The computed MMSE matrix is projected into appropriately selected reduced/low-dimensional space 410, which yields a low-dimensional MMSE matrix, whose entries constitute the set of filter coefficients 223. Also, the MMSE matrix is used to compute 420 dictionary matrix 224, used for symbol detection.

Figure 5A:
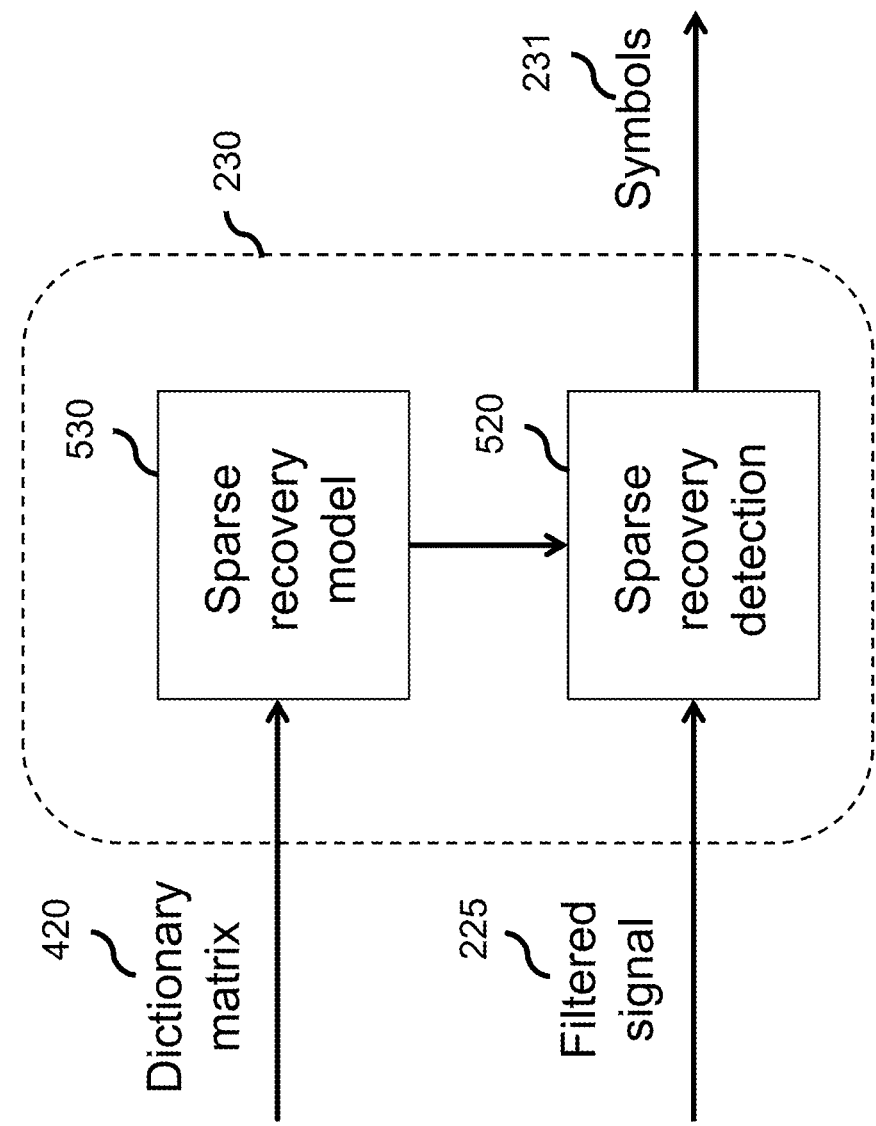
FIG. 5A shows a block diagram of the detector according to some embodiments.

FIG. 5A shows a block diagram of the detector 230 according to some embodiments. In various embodiments, the symbols 231 are detected from the filtered signal 225 using a sparse recovery detection 520. The sparse recovery detection is based on a sparse recovery model 530, which includes the dictionary matrix 420.

Figure 5B:
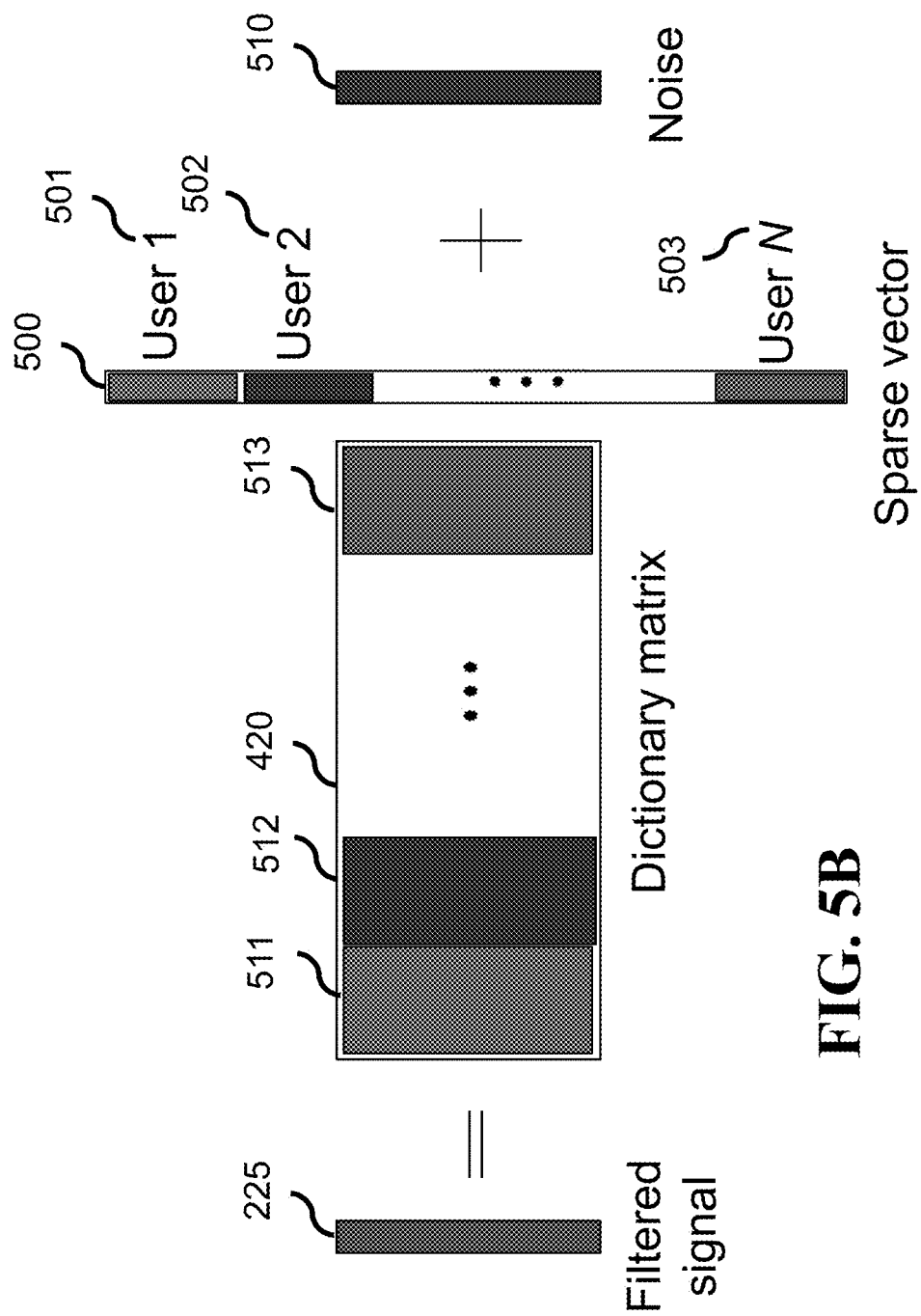
FIG. 5B shows a schematic of a sparse recovery model used by some embodiments for symbol detection.

FIG. 5B shows a schematic of a sparse recovery model used by some embodiments for symbol detection. The filtered signal 225 is given as the product between the dictionary matrix 420 and a long sparse vector 500, embedded into noise 510. The sparse vector comprises of symbols 501, 502, 503, transmitted by users 1, 2, . . . , N. In some implementations, if some user is inactive, it is regarded to transmit symbol 0. Each column in the dictionary matrix 420 corresponds to one particular user. As such, 511, 512 and 513, correspond to, respectively, User 1's transmitted data 501, User 2's transmitted data 502 and User N's transmitted data 503.

Signal Model

In various embodiments, each of N users is equipped with a spreading code $s_u(t)$ acting upon the transmitted symbol. Notably, $0 \leq t \leq T$, where T is the symbol duration. The signal received at the base station during one signaling interval is given by $$y(t) = \sum_{n=1}^{N} h_n b_n s_n(t) + w(t), 0 \leq t \leq T, \quad (1)$$

where $w(t):CN(0,\sigma^2)$ is additive white Gaussian noise (AWGN), $h_n \in C$ is channel realization between user n and the base station, while $b_n$ is the transmitted symbol of user n at the considered signaling interval. Without loss of generality, we assume the users employ binary phase shift keying (BPSK) modulation. In addition, if a user n does not transmit during 0<t<T, $b_n$=0.

For clarity of description, this discloser uses the discrete-time domain signal representation. However, the mapping between analog and discrete-time domains is readily available. The discrete-time domain representation of the signal model (1) is obtained assuming discretization whose sampling frequency is equal to the chip rate of $s_n(t)$. Thus, $$y = SHb_b + w, \quad (2)$$

where S is the matrix of spreading codes whose n-th column is the discretized spreading code $s_n(t)$, denoted $s_n$, H=diag ($h_1, \ldots, h_N$) is the channel matrix, while b is the vector of transmitted symbols whose n-th entry is the transmitted symbol from user n. Finally, w is the AWGN vector with w:$CN(0,\sigma^2 I_N)$, where $I_N$ is order-N identity matrix.

Figure 4B:
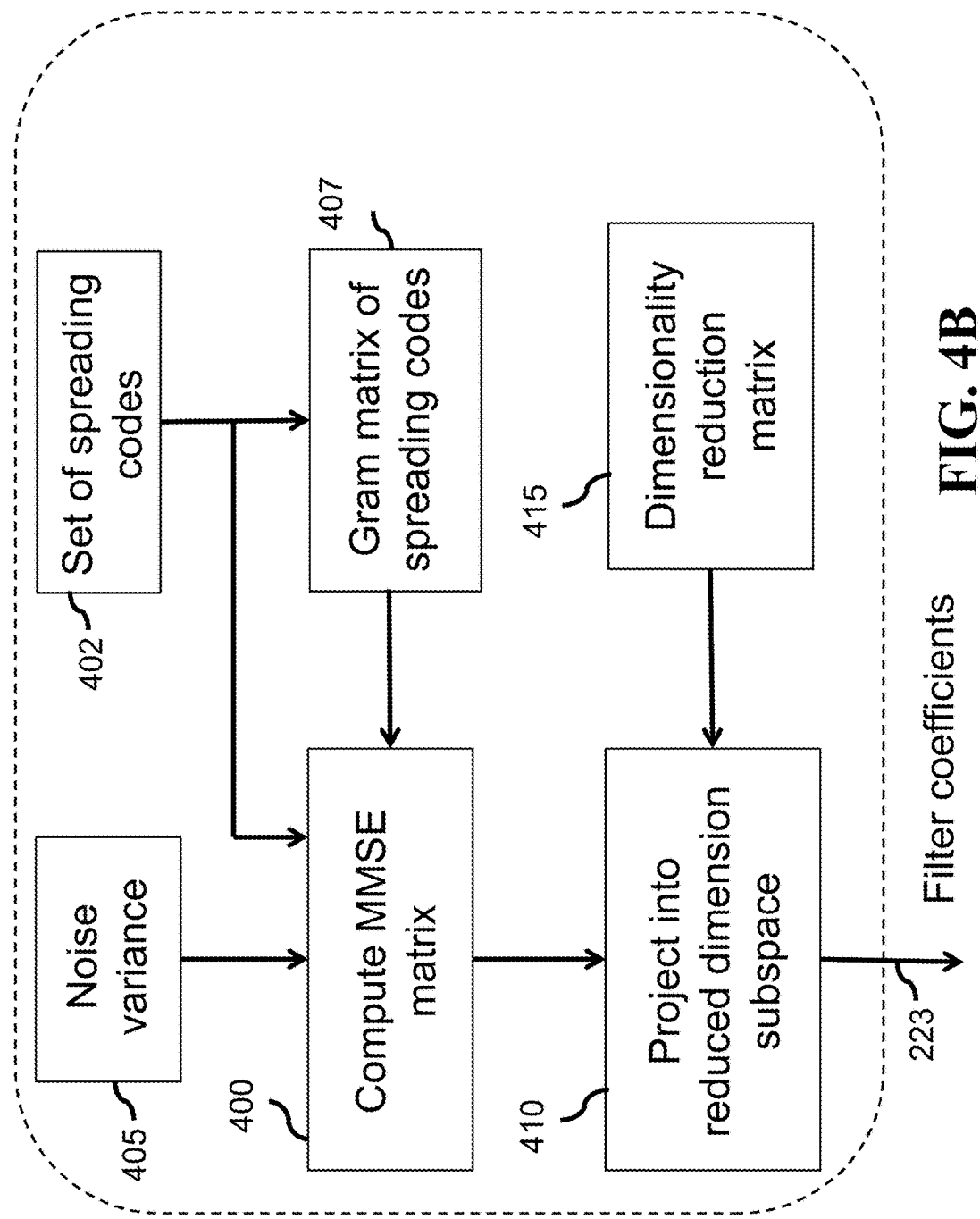
FIG. 4B shows a block diagram of a method used by the processor to compute filter coefficients according to one embodiment.

FIG. 4B shows a block diagram of a method used by the processor 222 to compute filter coefficients according to one embodiment. In this embodiment, the processor 222 computes the filter coefficients in two steps. First, the processor computes the minimum mean square error (MMSE) matrix 400 corresponding to the set of spreading codes 402 assigned to the users and noise variance 405. Second, the obtained MMSE matrix is projected into a lower/reduced dimension subspace 410.

The MMSE matrix, denoted with $G_{MMSE}$, is given by $$G_{MMSE}=(G+\sigma^2 I)^{-1}S^H \qquad (3)$$

where $G=S^H S$ is the Grain matrix of the matrix of spreading codes S. The MMSE matrix is the linear processor, optimal in the mean square error sense. That means that its coefficients are computed so as to minimize the power in the error between the desired signal, i.e., the one we expect to see, and the MMSE output. The facts that it is linear and optimal in the mean square error sense are the reasons why we selected it as the basic building block of the reduced dimension processing (RDP).

The reduced-dimension minimum mean square error (RD-MMSE) matrix is obtained by cascading the MMSE matrix with the dimensionality reduction transformation A, and is given by $$F_{RD-MMSE}=AG_{MMSE}=A(G+\sigma^2 I)^{-1}S^H. \qquad (4)$$

In other words, the MMSE matrix is projected into a reduced dimension subspace in 410. This is done by multiplying the MMSE matrix with a "low-dimensional" matrix. The rank of A is M and equal to the dimension of the low dimensional space.

As indcted in (3), the MMSE matrix is computed from the noise variance 405, set of spreading codes 402 and the Gram matrix of the spreading codes $G=S^H S$ 407. The MMSE matrix is then projected 410 into a reduced dimension subspace using dimensionality reduction matrix 415.

Dictionary Matrix

Some embodiments uses the model for the filtered signal 225 having the coefficients of the filter 220 set according to $F_{RD-MMSE}$. The RD-MMSE filtered signal 225 is using (2) and (4) given by $$r_{RD-MMSE}=A(G+\sigma^2 I)^{-1}GHb+w_{RD-MMSE} \qquad (5)$$

where $w_{RD-MMSE}$:$CN(0,\Sigma_{RD-MMSE})$ with $$\Sigma_{RD-MMSE}=\sigma^2*+\sigma^2 I)^{-1}G(G+\sigma^2 I)^{-1}A^H. \qquad (6)$$

The filtered signal can be succinctly represented as $$r_{RD-MMSE} \pm C_{RD-MMSE}b+w_{RD-MMSE} \qquad (7)$$

where $$C_{RD-MMSE}=A(G+\sigma^2 I)^{-1}GH. \qquad (8)$$

Because only a small number of users are active at a given signaling time interval, the vector of transmitted symbols b is sparse so that (4) is a sparse recovery model for unknown symbols. The dictionary matrix, also called sensing matrix, of the sparse recovery formulation (4), is $C_{RD-MMSE}$. This matrix is needed for sparse recovery detection in the detector 230 and is computed in 420.

Figure 4C:
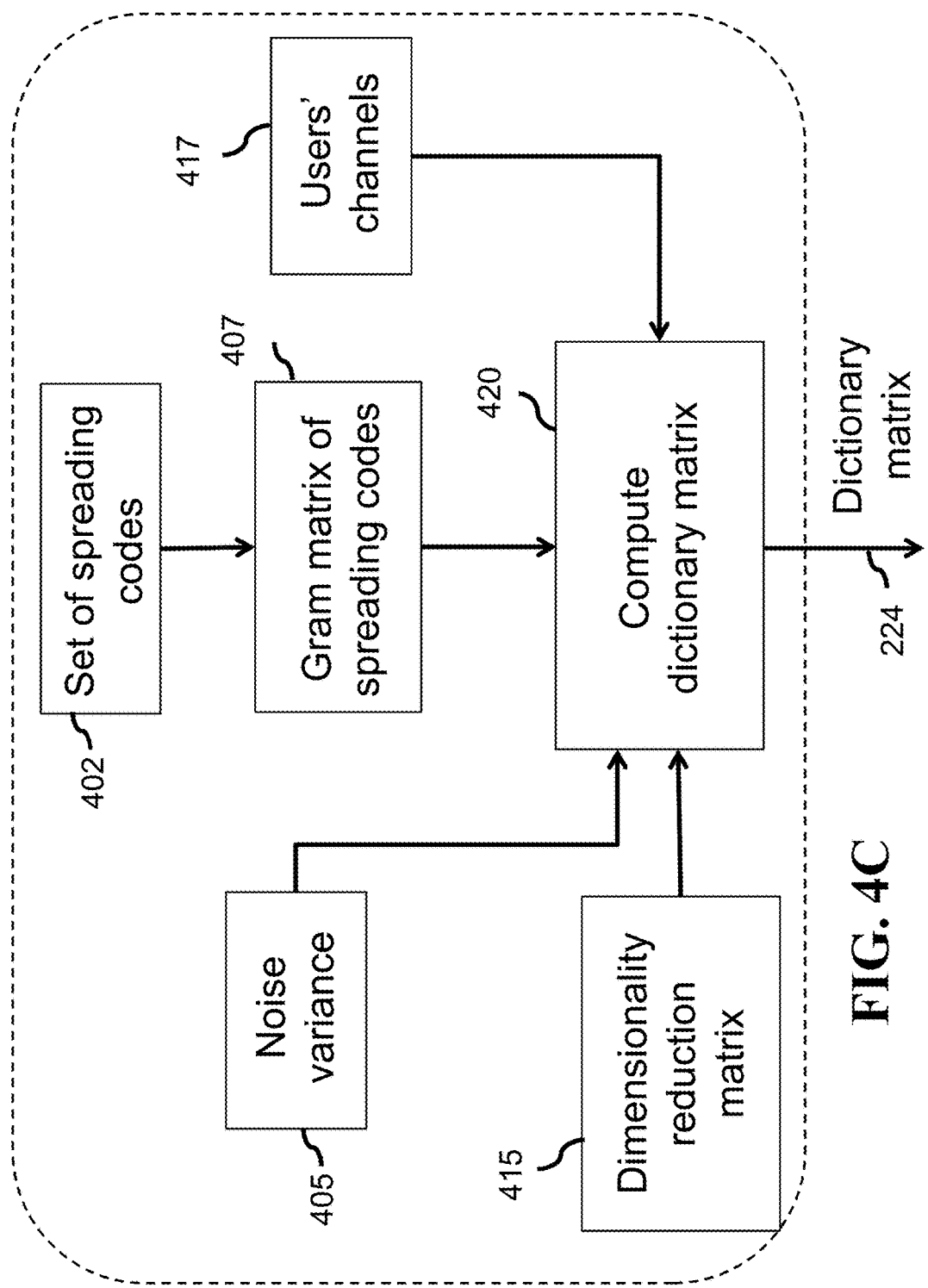
FIG. 4C shows a block diagram of a method for computing a dictionary matrix implemented by the processor according to some embodiments.

FIG. 4C shows a block diagram of a method for computing a dictionary matrix implemented by the processor 222 according to some embodiments. For example, as instructed by (8), the dictionary matrix 224 is computed 420 from noise variance 405, dimensionality reduction matrix 415, user's channels H 417 and the Grain matrix, obtained in 407 from the set of spreading codes 402. Some embodiments estimate users' channels using various channel estimation methods. Additionally or alternatively, some embodiments avoid channel estimation, as described below.

Figure 4D:
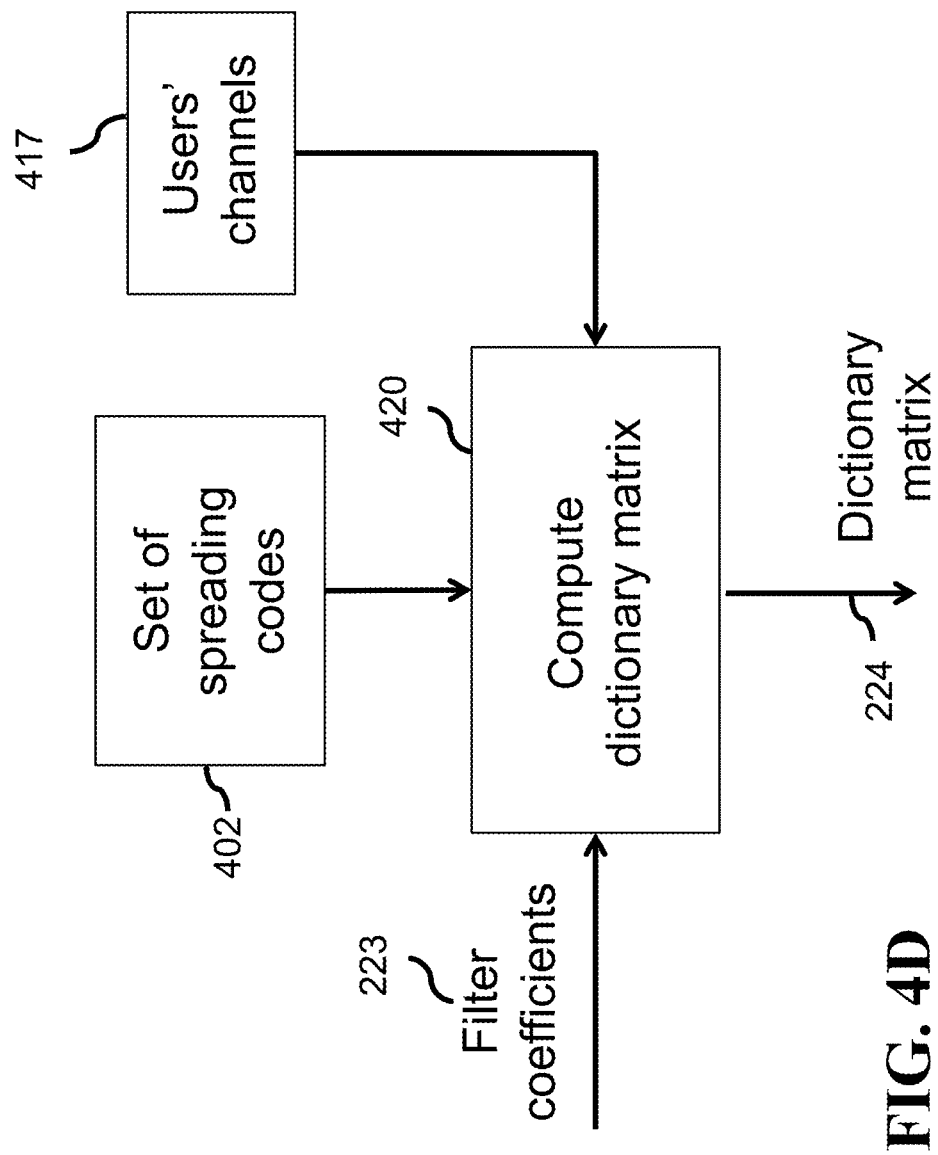
FIG. 4D shows a block diagram of an implementation of computing a dictionary matrix according to one embodiment.

FIG. 4D shows a block diagram of an implementation of computing a dictionary matrix according to one embodiment. For example, the comparison between (4) and (8) yields that the dictionary matrix can be expressed as $$C_{RD-MSSE}=F_{RD-MSSE}SH \qquad (9)$$

To that end, the embodiment computes the dictionary matrix from the filter coefficients 223, set of spreading codes 402 and users' channels 417.

Detector

It is an object of some embodiments to detect K active users and their symbols. To reduce the computational complexity arising from using conventional, fully-fledged processors consisting of N filters (one for each user), the received signal is processed through a processor consisting of M filters. Mathematically, the received signal is projected into a lower, M-dimensional subspace by applying A to one of the conventional processors.

The detection of active users and their symbols from the filtered signal $r_{RD-MMSE}$ in the reduced-dimension space is possible because only a small number of users transmit at a given signaling interval, thereby giving rise to sparsity in the user activity domain.

The filtered signal is used to detect active users and their transmitted symbols. A number of algorithms can be used for this task. To simplify the notation, in this discloser the filtered signal r is given by $$r=Cb+v, \qquad (10)$$

where C is the dictionary matrix, b is a sparse vector of transmitted symbols, and v is noise. Referring back to FIG. 5A, the dictionary matrix 420 is C in the sparse model (10) 530. The filtered signal r is input to a sparse recovery detection algorithm 520.

Figure 5C:
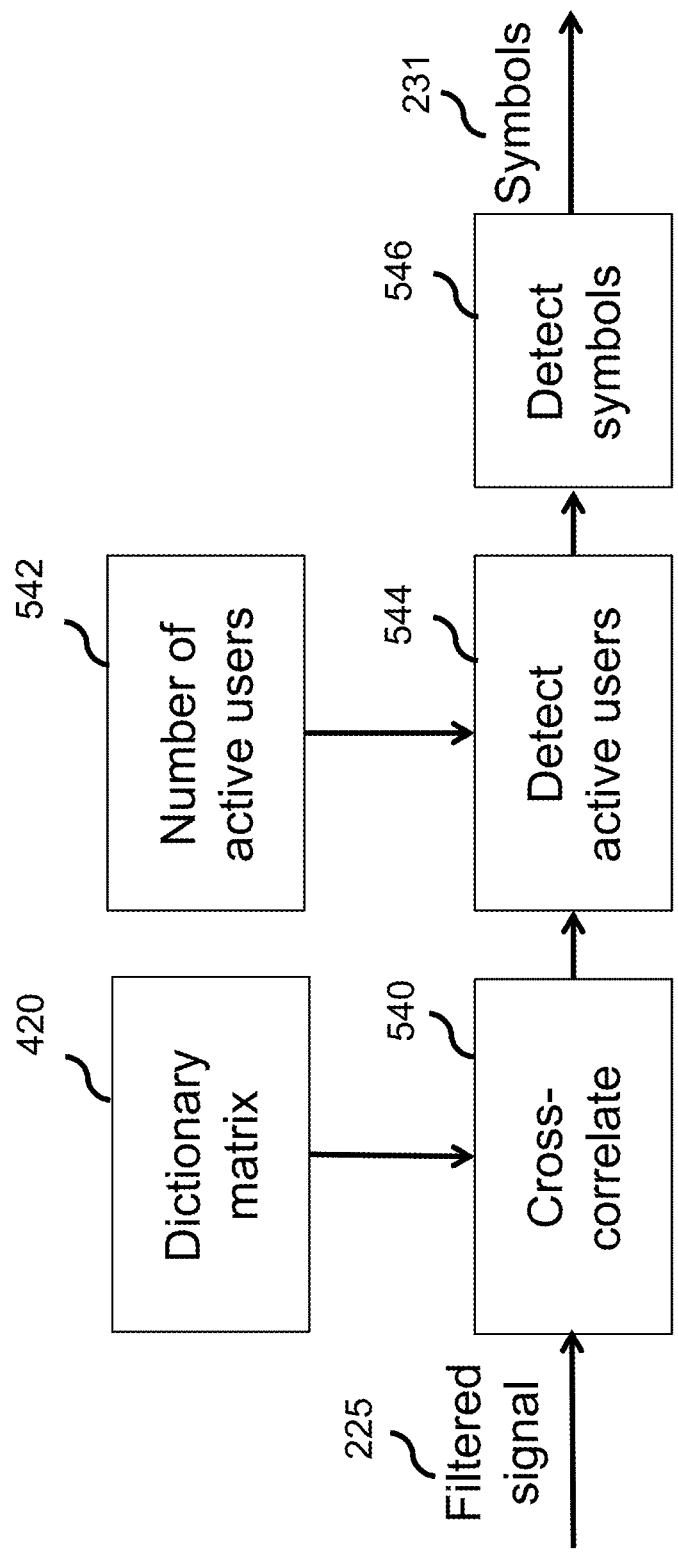
FIG. 5C shows a block diagram of the reduced dimension decorrelating (RDD) detection used by one embodiment to detect symbols.

FIG. 5C shows a block diagram of the reduced dimension decorrelating (RDD) detection used by one embodiment to detect symbols. The RDD cross-correlates 540 each column in the dictionary matrix C 420 with the filtered signal r 225, $$t_n=|\Re[c_n^H r]|, \qquad (11)$$

where $c_n$ is the n-th column of C. Assuming the number of active users K 542 is known, the active users are detected 544 from the indices of the K largest statistics $\{t_n\}_{n=1}^N$. The BPSK symbols of the detected active users are recovered 546 as $$\hat{b}_n=\text{sgn}(r_n \Re[c_n^H r]), \qquad (12)$$

where the sign operator, sgn{ }, is in accordance with the real-valued symbol alphabet. Overall, the RDD is a one-shot detector of active users and their symbols.

Figure 5D:
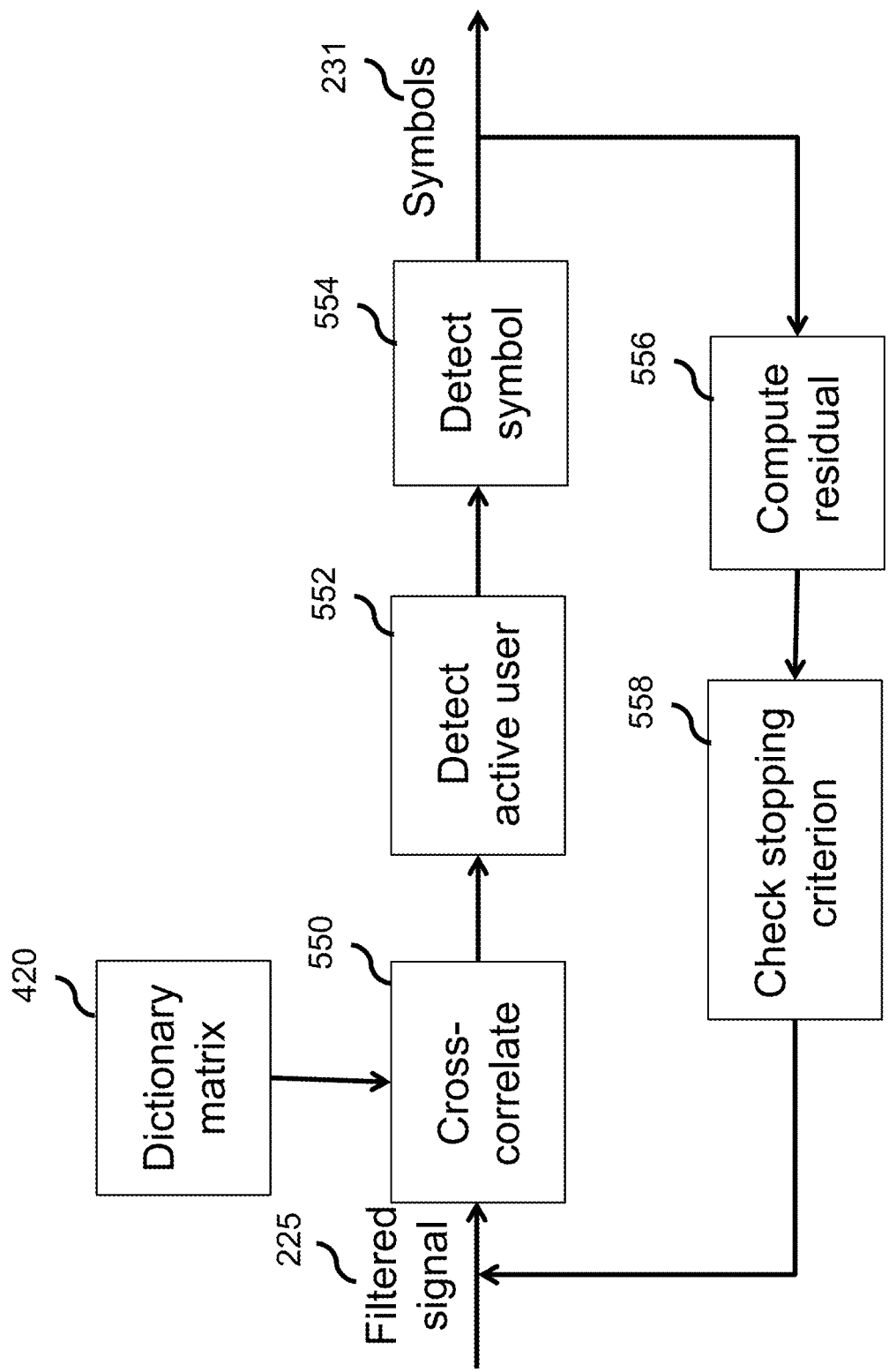
FIG. 5D shows a block diagram of the reduced dimension decision feedback (RDDF) detection used by one embodiment for sparse recovery detection.

FIG. 5D shows a block diagram of the reduced dimension decision feedback (RDDF) detection used by one embodiment for sparse recovery detection 520. The RDDF is an iterative procedure which follows the principles of the successive interference cancellation (SIC), where one active user and its symbol are recovered in each iteration. Specifically, an active user in the k-th iteration is detected 552 using cross-correlation 550 so that $$n_k=\text{argmax}_n |\Re[c_n^H v^{k-1}]|, \qquad (13)$$

where $v^{k-1}$ is the residual evaluated in the previous iteration. Note that $v^{(0)}=r$. In other words, the cross-correlation in 550 is taken between the filtered signal 225 and each column of the dictionary matrix 420 in the first iteration. The transmitted symbol of the k-th active user is detected as 554

$$b_n^{(k)} = \text{sgn}(r_{n_k} \Re \lfloor c_{n_k}^H r \rfloor) \quad (14)$$

Finally, the residual is updated as 556

$$v^k = y - Cb^{(k)}, \quad (15)$$

where $b^{(k)}$ is the vector whose entries are the estimated symbols of the users recovered up to and including iteration k. The entries corresponding to all other users are 0. The obtained residual signal is input into the cross-correlation device 550 in the second and following iterations. The iterations are run until a certain stopping criterion is satisfied 558. In case the number of active users K is known in advance, the number of iterations is equal to the number of active users. In case K is unknown, ad-hoc methods can be employed to estimate K. For example, the RDDF algorithm may run iterations as long as the power in the residual signal is greater than some threshold, dependent upon the noise variance. For example, the threshold can be equal to one-tenth of the noise variance.

Figure 5E:
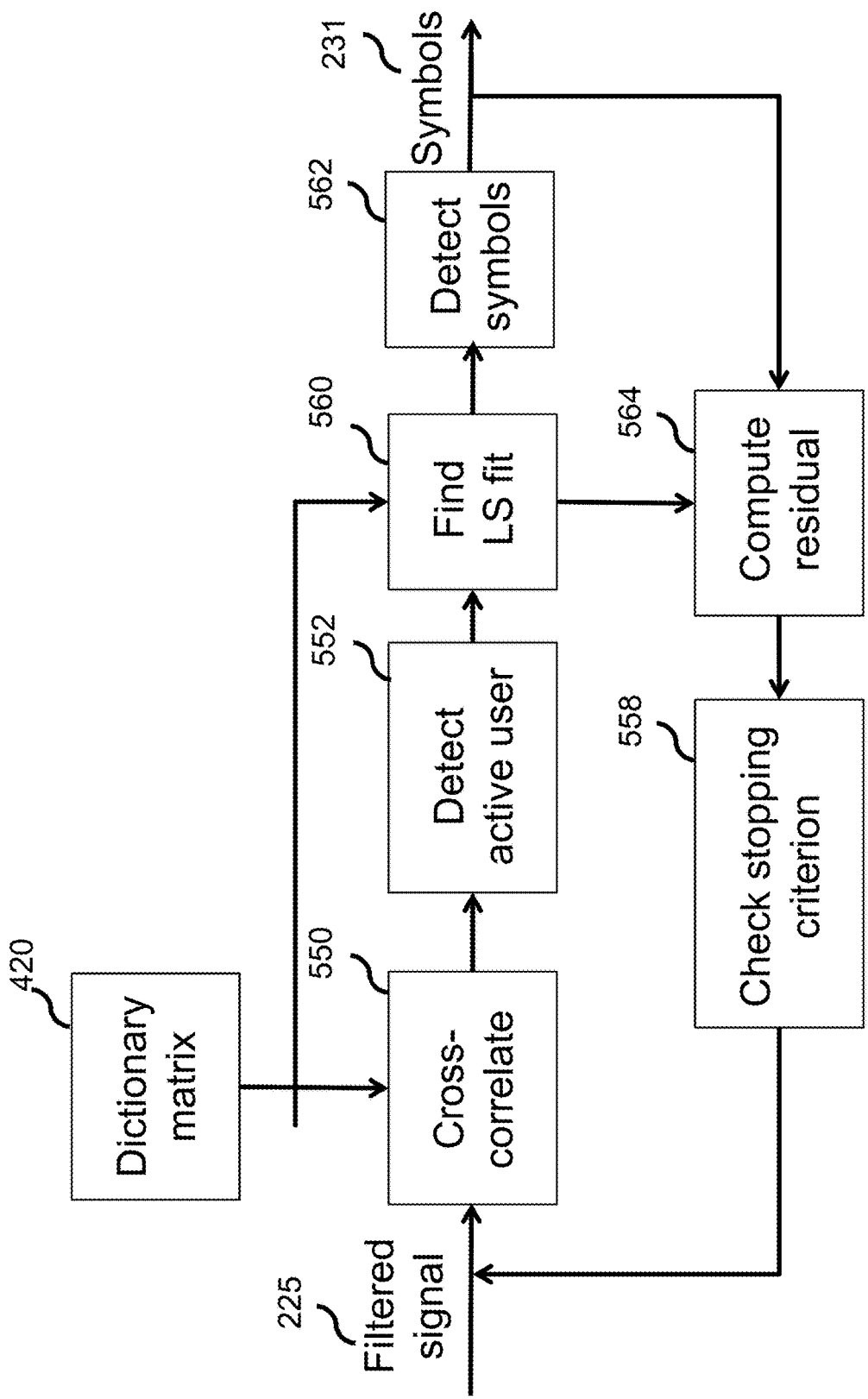
FIG. 5E shows a block diagram of the orthogonal matching pursuit (OMP) detection used by one embodiment for sparse recovery detection.

FIG. 5E shows a block diagram of the orthogonal matching pursuit (OMP) detection used by one embodiment for sparse recovery detection 520. Contrary to the RDDF, the filtered signal is represented in each iteration as the weighted sum of the columns in the dictionary matrix which correspond to active users detected up to and including that iteration. This is done by means of finding the least squares (LS) fit 560. The symbols of active users detected up to and including that iteration are detected 562 by finding the closest constellation points to the obtained LS weights. The residual signal is computed 564 as the difference between the filtered signal and the LS fit.

Pre-Whitening

In some implementations, the noise processes at the RDP outputs are Gaussian distributed, of zero mean, but non-identity covariance matrix. Some sparse recovery detections do not take noise statistics into account, thereby inherently assuming white noise. To that end, some embodiments perform the pre-whitening of the received signal y so that the output noise from the RDP is white. In such a manner, the detection performance of the receiver with sparse recovery is improved.

Figure 4E:
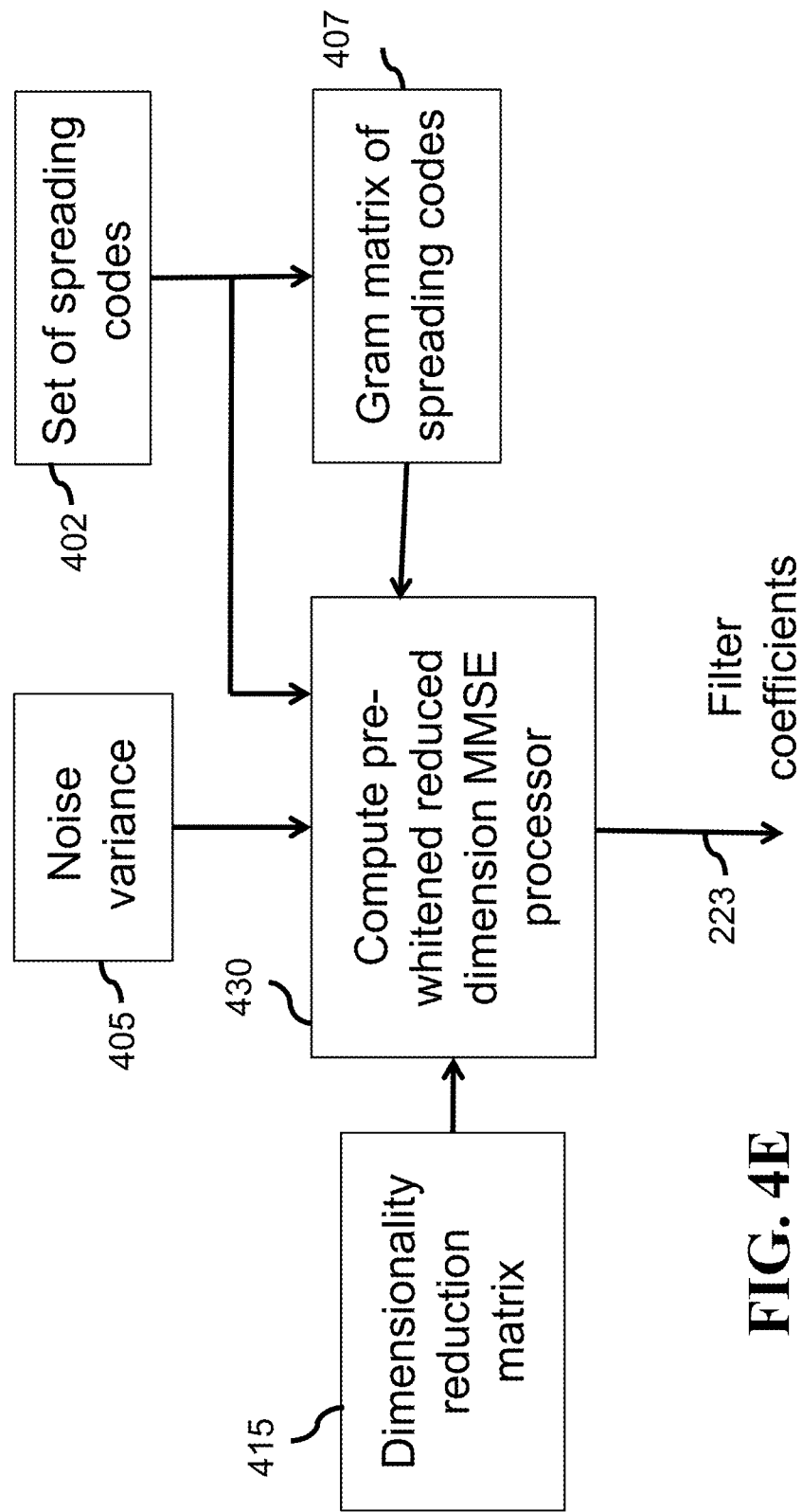
FIG. 4E shows a block diagram of a method that computes pre-whitened filter coefficients according to some embodiments.

FIG. 4E shows a block diagram of a method that computes pre-whitened filter coefficients according to some embodiments. For a general RDP processor F which gives rise to the output noise correlation matrix $\Sigma$, the pre-whitened RDP, $\tilde{F}$, is obtained as $$\tilde{F} = \sum^{-\frac{1}{2}} F, \quad (16)$$

where $\Sigma$ and F are, respectively, given by (6) and (4). The pre-whitening 430 implements (16).

Consequently, the resulting ductionary matrix $\tilde{C}$ is using (2) given by $$\tilde{C} = \tilde{F}SH \quad (17)$$

such that the output from the pre-whitened RDP is $$r = \tilde{C}b + w, \quad (18)$$

where $w: CN(0,I)$. The same principal block diagram as shown in FIG. 4D applies here as well, with the note that the filter coefficients 223 are those obtained at the output of the block diagram shown in FIG. 4E.

Figure 6A:
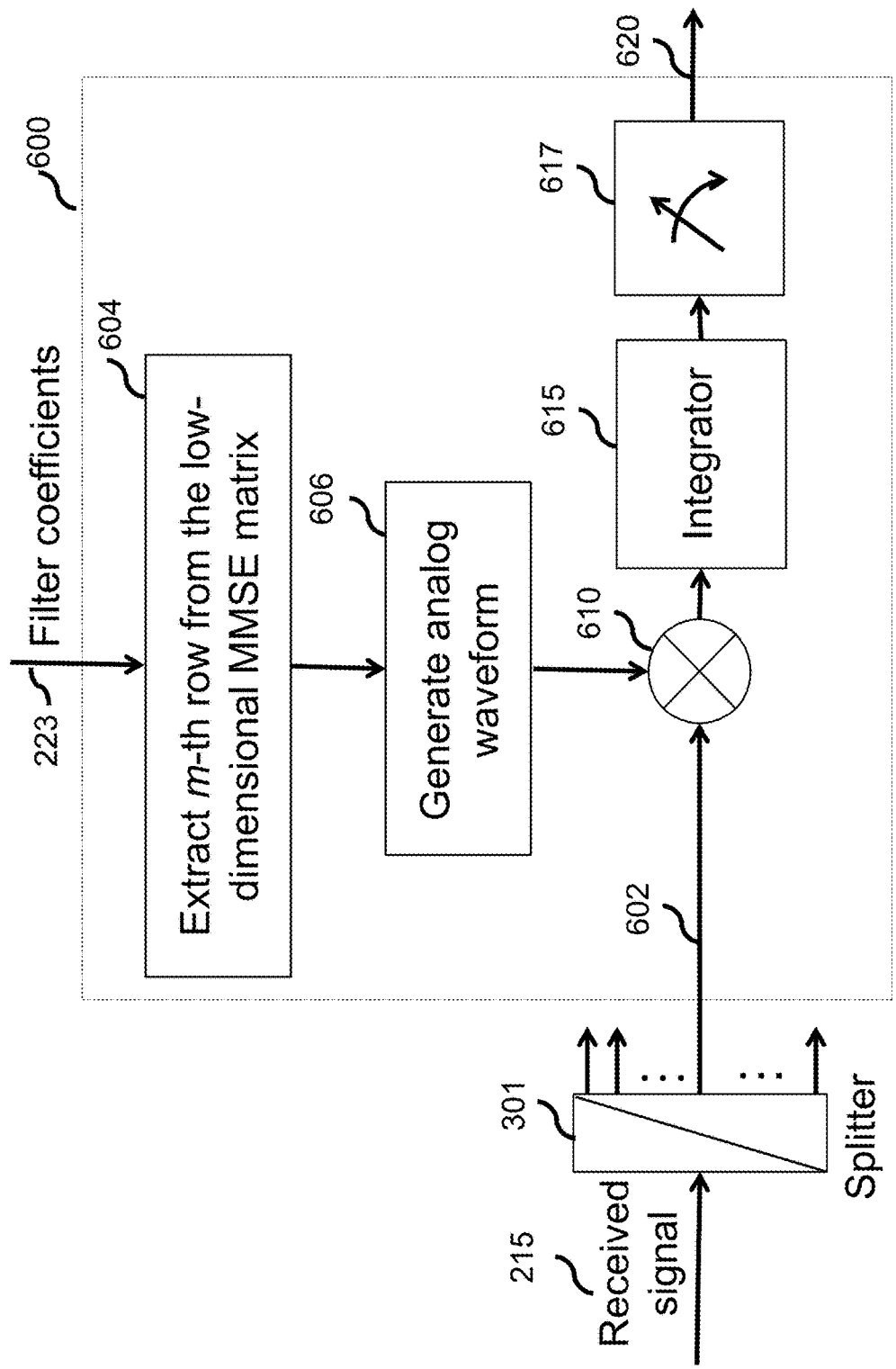
FIG. 6A shows a block diagram of analog implementation of the filter according to one embodiment.

FIG. 6A shows a block diagram of analog implementation of the filter 200 according to one embodiment. The filter 220 includes correlators 600. The number of correlators M is smaller, and preferably much smaller, than the number of users N. The received signal 215 in analog domain goes through a splitter 301. The number of splitter's outputs is equal to the number of correlators in the filter so that each splitter's output is input to one correlator. Thus, a repeated version of the received signal on splitter's output 602 enters a corresponding correlator 600. The correlator extracts 604 one particular row from the matrix of filter coefficients $F_{RD-MMSE}$ 223 that correspond to that correlator. Recall that the number of rows in $F_{RD-MMSE}$ is M such that each row is used by one correlator. The extracted row of filter coefficients is input to generator 606 which generates an analog signal waveform from it. The received signal on splitter's output 602 is then multiplied 610 with the generated analog waveform. The resulting signal is integrated in 615. The integrator output is sampled 617 to produce the sampled symbol 620. The sampling period in 617 is equal to the signaling interval. The sampled symbol is one of the inputs to the combiner 320.

In such a manner, the correlator 600 takes the portion of the received signal corresponding to one signaling interval, multiples it with the analog waveform generated according to filter coefficients corresponding to that correlator, and integrates the result. This results in a single statistics that is combined with the statistics from other correlators and used to detect transmitted symbols.

An advantage of this embodiment is that all samplers, i.e., analog-to-digital converters (ADCs), operate at the symbol rate. On the other hand, the main difficulty arises from generating analog waveforms and using analog multiplier in each correlator.

Figure 6B:
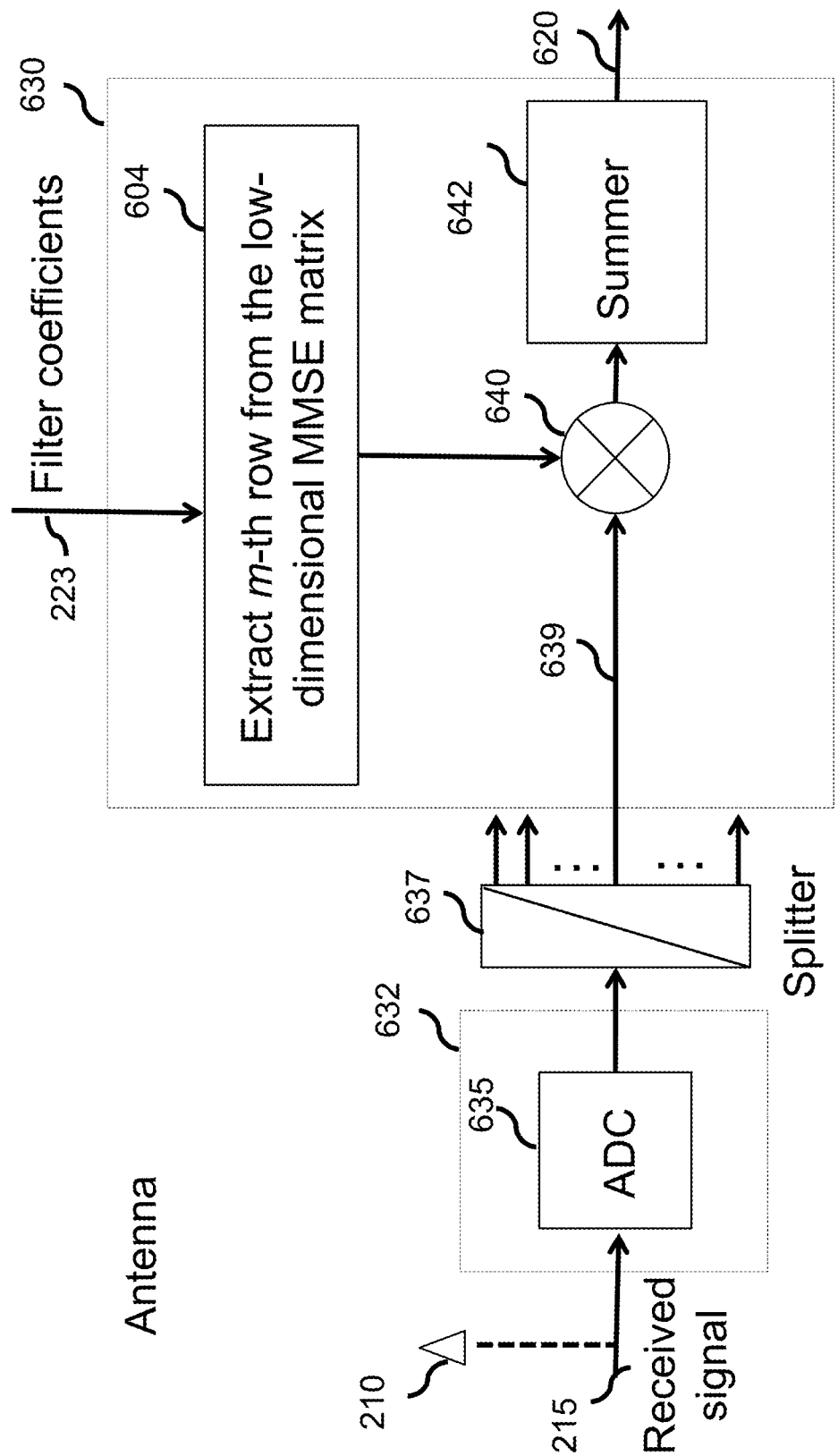
FIG. 6B shows a block diagram of a digital implementation of the filter according to one embodiment.

FIG. 6B shows a block diagram of a digital implementation of the filter 200 according to one embodiment. A front end 632 is connected with the antenna 210 and processes the received signal 215. In some implementations, the front end implements an ADC 635 which operates at the chip rate. The resulting digital signal goes through a splitter 637, whose each output is connected to one correlator 630. The correlator extracts 604 the corresponding row from the matrix of filter coefficients 223. The extracted row and the digitized received signal 639 are multiplied in digital multiplier 640 and the resulting samples are summed 642. In other words, the samples of the received signal within one signaling interval are aligned with the corresponding filter coefficients, multiplied and summed. This operation results in sampled symbol 620, which then enters the combiner 320.

In comparison to the analog implementation from FIG. 6A, the digital implementation does not require generation of analog waveforms and implements multiplication and integration in the digital domain in a much more efficient manner. However, this comes at the expense of needing a high rate ADC.

The reduced dimension processor relies on the dimensionality reduction transformation, also called low-dimensional matrix, A to effectively project the detection problem into a lower dimensional space. The detection of active users and their symbols is essentially a sparse recovery problem. The separability of active users in the reduced dimension space directly depends on the coherence properties of the sensing matrix C. In some implementations, the coherence of a matrix is the largest cross-correlation between its different columns. Consequently, A is selected so as to minimize the coherence of the sensing matrix C. In such a manner, the coherence of C does not depend on diagonal channel matrix H, so that A can be pre-computed offline without knowing H. In such a manner, the accuracy of the dimensionality reduction is increased.

The matrix A can be selected in multiple ways. A simple approach is to randomly sample a matrix from some set of random matrices. For example, that set can be a set of Gaussian matrices with independent, identically distributed Gaussian entries of zero mean and unit variance. Another example of that set is the set of partial Discrete Fourier Transform (DFT) matrices, such that the matrix A is obtained by uniformly at random sampling M rows from order-N DFT matrix. A yet another set can be a set of matrices with independent, identically distributed entries sampled uniformly at random from the set $\{+1,-1\}$. Other domains for sampling the matrix A from are also possible.

Figure 7A:
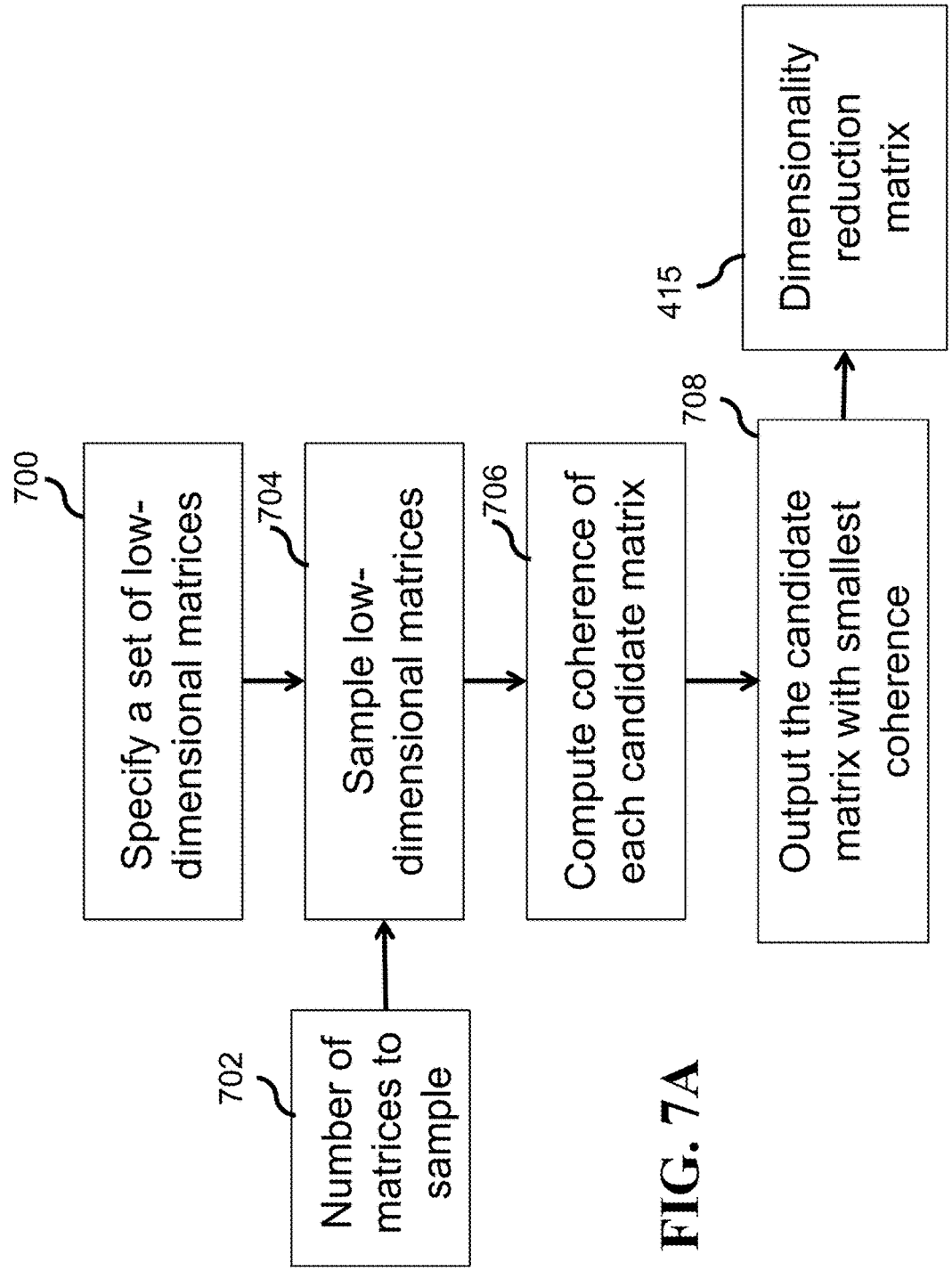
FIG. 7A shows a block diagram of a method for determining a low-dimensionality matrix according to one embodiment.

FIG. 7A shows a block diagram of a method for determining a low-dimensionality matrix according to one embodiment. This embodiment starts with specifying a set of low-dimensional matrices 700. A specified set of low-dimensional matrices can be a set of random matrices with i.i.d. CN(0,1) entries, with columns normalized to unit norm. Another choice can be a set of partial discrete Fourier transform (DFT) matrices, generated by selecting uniformly at random M rows from the discrete Fourier transform (DFT) matrix of order N. Yet another choice can be a set of bipolar matrices whose entries are i.i.d. samples from the set $\{+1,-1\}$. After the set of low-dimensional matrices is specified, a certain, pre-determined number of matrices 702 is sampled 704 from that specified set. Moving forward, coherence of each candidate matrix is computed 706 as the largest cross-correlation from any pair of different columns. The candidate matrix yielding the smallest coherence is output 708 and stored as the dimensionality reduction matrix 415 and used to compute filter coefficients and dictionary matrix.

Figure 7B:
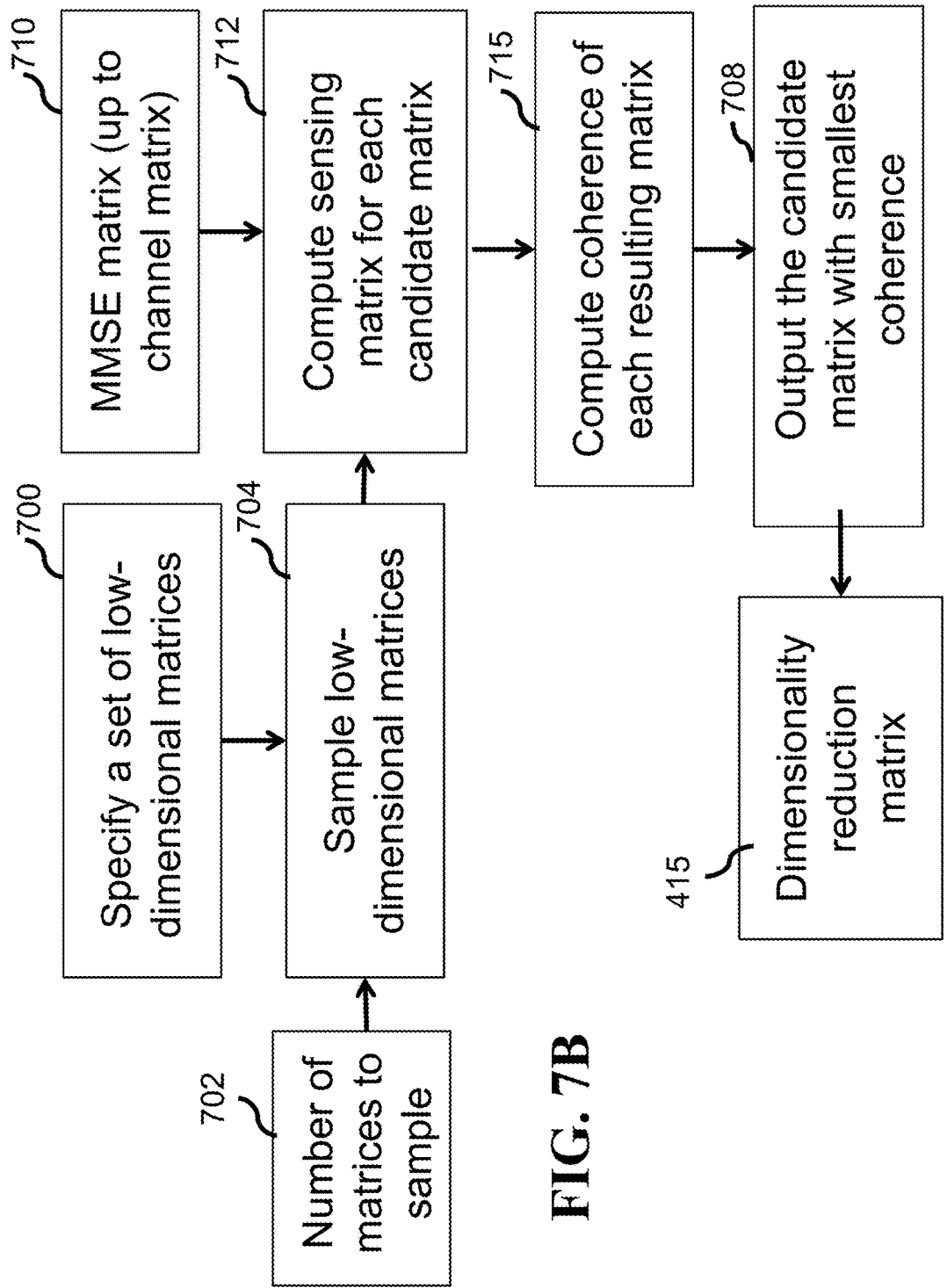
FIG. 7B shows a block diagram of a method for determining a low-dimensionality matrix according to another embodiment.

FIG. 7B shows a block diagram of a method for determining a low-dimensionality matrix according to another embodiment. For example, aside from selecting A which has the smallest coherence among a number of randomly generated candidates, A can also be selected so that the sensing matrix C has the smallest coherence.

In this embodiment, a set of low-dimensional matrices is also specified 700 and a certain number 702 of matrices is sampled 704 from that set. Then, a sensing matrix corresponding to each sampled/candidate matrix is computed 712. This is done by multiplying the candidate matrix and the MMSE matrix 710.

Additionally or alternatively, the candidate matrix can be multiplied with the MMSE matrix up to channel matrix because the channel matrix may not be known. After this step, coherence of the resulting matrix for each candidate matrix is computed 715 and the candidate matrix which yields the smallest coherence of the resulting sensing matrix is output 708 and stored as the dimensionality reduction matrix 415. Overall, in case of the RD-MMSE matrix, A can be selected so as to minimize the coherence of $A(G+\sigma^2 I)^{-1}G$.

Notably, in both embodiments of FIGS. 7A and 7B, if pre-whitened processor is used, A can be selected so that the coherence of the resulting pre-whitened processor $\tilde{C}$ is minimized. For example, referring to FIG. 7B, the sensing and/or dictionary matrix computed in 712 can be the pre-whitened one.

Some embodiments use the noise variance to compute the filter coefficients and dictionary matrix. The noise variance may be known in advance and pre-set. Alternatively, the noise variance can be estimated from the received signal.

In various embodiments, the uplink channels from all users are known at the receiver. This can be achieved by employing any of a large number of channel estimation techniques and protocols. For example, in one embodiment, a base station or access point exchange pilot signals with each user separately and estimate each user uplink channel. This embodiment can take advantage from legacy estimation techniques.

However, the one challenge that lies in having a large number of users assigned to the same base station so that estimating all channels with techniques where network control coordinates the orthogonal transmission of pilots from each of the users to the base station is impractical. This problem is even more exacerbated when channels vary in time.

Figure 8:
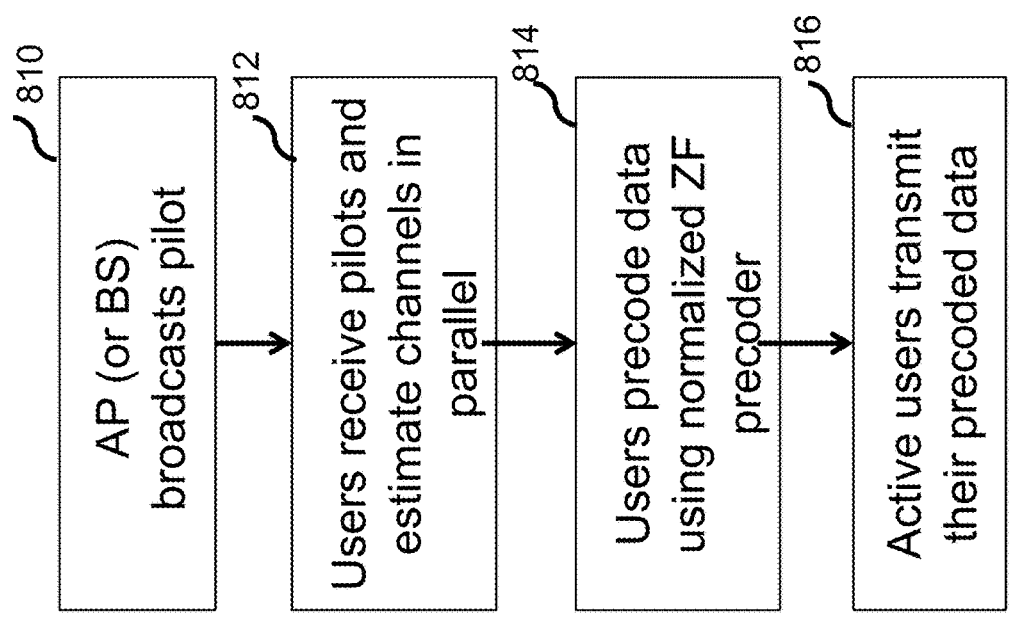
FIG. 8 shows a block diagram of channel estimation and information precoding used by some embodiments based on time domain duplex (TDD).

FIG. 8 shows a block diagram of channel estimation and information precoding used by some embodiments based on time domain duplex (TDD). The base station (or access point) broadcasts 810 pilot symbols that facilitate downlink channel estimation at each user in parallel. Namely, assuming the transmitted pilot is x, user n receives signal $y=h_n x+w$, where w is noise, and estimates the channel 812. For example, the least squares (LS) channel estimate is given by $$\hat{h}_{LS} = \frac{x^H x}{x^H y} \qquad (19)$$

Each user then precodes its symbols based on the estimated channel by employing the zero-forcing (ZF) precoder. Due to the TDD and ZF precoding, the received signal at the base station does not explicitly depend on the channel coefficients. However, one issue with this approach is that if a certain channel is low in magnitude, the ZF precoded signal has a relatively large power. While this issue does not pose a significant challenge in a network of smart meters, the context in which this approach is proposed, this is, in general, undesirable.

To overcome an issue arising from ZF precoding of transmitted symbols, in some embodiments, users precode their symbols using a unit magnitude, i.e., normalized, ZF precoder 814. That is, the precoder n is given by $$p_n = \frac{h_n^*}{|h_n|}, \qquad (20)$$

where $h_n$ is the channel coefficient of user n. The active users then transmit the precoded data symbols 816. The vector of transmitted symbols from all users is therefore $$b=Pb, \qquad (21)$$

where $P=\text{diag}\{p_1, \ldots, p_N\}$. Substituting b in place of b in (2) yields $$y=SHPb+w. \qquad (22)$$

Finally, substituting (20) into (22) yields $$y=S\tilde{H}_b+w, \qquad (23)$$

where $\tilde{H}=\text{diag}\{|h_1|, \ldots, |h_N|\}$, and hence the received signal only depends on channel magnitudes.

The received signal (23) can then be processed through any of the reduced dimension processors and all previous discussion applies here. In fact, a careful examination reveals that RDD, RDDF or OMP-based detection of active users and their transmitted symbols do not require knowledge of the channel magnitudes. Moreover, this scheme, where users apply unit magnitude ZF precoding on their symbols so that the detection is possible without channel state information at the receiver, is amenable to any constant modulus modulation format.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

The terms "program" or "software" are used herein in a generic sense to refer to any type of computer code or set of computer-executable instructions that can be employed to program a computer or other processor to implement various aspects of the present invention as discussed above.

Computer-executable instructions may be in many forms, such as program modules, executed by one or more computers or other devices. Generally, program modules include routines, programs, objects, components, and data structures that perform particular tasks or implement particular abstract data types. Typically the functionality of the program modules may be combined or distributed as desired in various embodiments. A processor for performing a function, performing a function or configured to perform a function can be implemented using circuitry in any suitable format that is programed or otherwise configured to perform the function without additional modifications.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A communication system, comprising:
    a receiver including an antenna to receive a signal including one or combination of symbols transmitted by multiple transmitters over wireless channels connecting the transmitters with the communication system, wherein the signal is encoded, such that each symbol is encoded with a spreading code selected from a set of spreading codes, and wherein the duration of the received signal is at least a duration of the spreading code;
    a filter to produce a filtered signal, wherein the filter includes a set of correlators to produce a set of filtered symbols and a combiner to combine the filtered symbols to produce the filtered signal, wherein each correlator includes coefficients to process the received signal to produce a filtered symbol, wherein a number of correlators in the set of correlators is less than a number of the spreading codes in the set of spreading codes;
    a processor to
    determine a minimum mean squared error (MMSE) matrix based on the set of spreading codes and a variance of noise in the wireless channels;
    project the MMSE matrix to a low-dimensional space to produce a low-dimensional MMSE matrix;
    update the coefficients of set of correlators with elements of the low-dimensional MMSE matrix; and
    update elements of a dictionary matrix based on the elements of the low-dimensional MMSE matrix; and
        a detector to detect the symbols transmitted by the transmitters from the filtered signal using a sparse recovery with the dictionary matrix.

2. The communication system of claim 1, wherein the signal is received in an analog domain, wherein each correlator includes
    a generator to generate an analog signal according to the coefficients of the correlator;
    a multiplier to multiply the generated analog signal with the received signal to produce a mixed signal;
    an integrator to integrate the mixed signal; and
    a sampler to sample the integrated mixed signal to produce the filtered symbol.

3. The communication system of claim 1, further comprising:
    a front end connected to the antenna to produce the received signal in a digital domain, wherein each correlator includes
        a multiplier to multiply the coefficients of the correlator with the digital signal to produce a mixed signal; and
        a summer to integrate the mixed signal to produce the filtered symbol.

4. The communication system of claim 1, wherein the processor projects the MMSE matrix to the low-dimensional space by multiplying the MMSE matrix with a low-dimensional matrix having a rank equals to dimension of the low-dimensional space.

5. The communication system of claim 4, wherein the processor selects the low-dimensional matrix randomly from one or combination of Gaussian matrices, discrete-Fourier-transform (DFT) matrices, and bipolar matrices.

6. The communication system of claim 4, wherein the processor selects the low-dimensional matrix from a set of low-dimensional matrices, such that a product of the selected low-dimensional matrix and the MMSE matrix results in the low-dimensional MMSE matrix with a minimum coherence among matrices equal to a product of the MMSE matrix and other low-dimensional matrices in the set of low-dimensional matrices.

7. The communication system of claim 6, wherein the set of low-dimensional matrices includes one or combination of Gaussian matrices, discrete-Fourier-transform (DFT) matrices, bipolar matrices.

8. The communication system of claim 4, wherein the processor selects the low-dimensional matrix from a set of low-dimensional matrices, such that a product of a pre-whitening low-dimensional MMSE matrix, the selected low-dimensional matrix, and the MMSE matrix results in the low-dimensional MMSE matrix with a minimum coherence among matrices equal to a product of the pre-whitening low-dimensional MMSE matrix, the MMSE matrix and other low-dimensional matrices in the set of low-dimensional matrices.

9. The communication system of claim 8, wherein the set of low-dimensional matrices includes one or combination of Gaussian matrices, discrete-Fourier-transform (DFT) matrices, bipolar matrices.

10. The communication system of claim 1, wherein a combination of the coefficients of the set of filters forms the low-dimensional MMSE matrix.

11. The communication system of claim 1, wherein a matrix formed by a combination of the coefficients of the set of correlators is a pre-whitening of the low-dimensional MMSE matrix.

12. The communication system of claim 1, wherein the processor estimates gains of the wireless channels and the variance of noise in the wireless channels, and updates the elements of the dictionary matrix based on the elements of the low-dimensional MMSE matrix and the gains of the wireless channels.

13. The communication system of claim 1, wherein the receiver receives the gains of the wireless channels from the transmitters, and updates the elements of the dictionary matrix based on the elements of the low-dimensional MMSE matrix and the gains of the wireless channels.

14. The communication system of claim 1, wherein the symbols in the signal are modulated with constant modulus modulation and precoded with normalized zero-forcing precoder rendering the dictionary matrix being independent from gains of the wireless channels.

15. A communication method that uses a processor coupled with stored instructions implementing the method, wherein the instructions, when executed by the processor carry steps of the method comprising:
   receiving a signal including one or combination of symbols transmitted by multiple transmitters over wireless channels connecting the transmitters with the communication system, wherein the signal is encoded, such that each symbol is encoded with a spreading code selected from a set of spreading codes, and wherein the duration of the received signal is at least a duration of the spreading code;
   filtering the signal to produce a filtered signal, wherein the filtering uses a set of correlators to produce a set of filtered symbols combined into the filtered signal, wherein each correlator includes coefficients to process the received signal to produce a filtered symbol, wherein a number of correlators in the set of correlators is less than a number of the spreading codes in the set of spreading codes;
   determining a minimum mean squared error (MMSE) matrix based on the set of spreading codes and a variance of noise in the wireless channels;
   projecting the MMSE matrix to a low-dimensional space to produce a low-dimensional MMSE matrix;
   updating the coefficients of set of correlators with elements of the low-dimensional MMSE matrix;
   updating elements of a dictionary matrix based on the elements of the low-dimensional MMSE matrix; and
   detecting the symbols transmitted by the transmitters from the filtered signal using sparse recovery with the dictionary matrix.

16. A non-transitory computer readable storage medium embodied thereon a program executable by a processor for performing a method, the method comprising:
   receiving a signal including one or combination of symbols transmitted by multiple transmitters over wireless channels connecting the transmitters with the communication system, wherein the signal is encoded, such that each symbol is encoded with a spreading code selected from a set of spreading codes, and wherein the duration of the received signal is at least duration of the spreading code;
   filtering the signal to produce a filtered signal, wherein the filtering uses a set of correlators to produce a set of filtered symbols combined into the filtered signal, wherein each correlator includes coefficients to process the received signal to produce a filtered symbol, wherein a number of correlators in the set of correlators is less than a number of the spreading codes in the set of spreading codes;
   determining a minimum mean squared error (MMSE) matrix based on the set of spreading codes and a variance of noise in the wireless channels;
   projecting the MMSE matrix to a low-dimensional space to produce a low-dimensional MMSE matrix;
   updating the coefficients of set of correlators with elements of the low-dimensional MMSE matrix;
   updating elements of a dictionary matrix based on the elements of the low-dimensional MMSE matrix; and
   detecting the symbols transmitted by the transmitters from the filtered signal using sparse recovery with the dictionary matrix.

\* \* \* \* \*